US006471256B1

(12) United States Patent
Fischer

(10) Patent No.: US 6,471,256 B1
(45) Date of Patent: Oct. 29, 2002

(54) COMPANION DUCT FLANGES

(75) Inventor: Herbert J. Fischer, Imperial, MO (US)

(73) Assignee: Engel Industries, Inc., St. Louis, MO (US)

( * ) Notice: Subject to any disclaimer, the term of this patent is extended or adjusted under 35 U.S.C. 154(b) by 0 days.

(21) Appl. No.: 09/615,940

(22) Filed: Jul. 13, 2000

Related U.S. Application Data

(63) Continuation-in-part of application No. 09/495,200, filed on Jan. 31, 2000.

(51) Int. Cl.$^7$ .................................................. F16L 23/00
(52) U.S. Cl. ........................ 285/424; 285/405; 285/368
(58) Field of Search ................................ 285/405, 424, 285/368

(56) References Cited

U.S. PATENT DOCUMENTS

| | | | |
|---|---|---|---|
| 2,895,214 A | 7/1959 | Erdmann | 29/229 |
| 2,900,107 A | 8/1959 | Erdmann | 221/220 |
| 2,906,433 A | 9/1959 | Erdmann | 221/220 |
| 2,973,108 A | 2/1961 | Gable | 214/8 |
| 3,023,493 A | 3/1962 | Mittermaier | 29/203 |
| 3,428,342 A | * 2/1969 | Chambers | 285/424 |
| 3,687,168 A | 8/1972 | Sherman et al. | 138/109 |
| 4,024,784 A | 5/1977 | Mueller | 83/488 |
| 4,038,128 A | 7/1977 | Mueller | 156/355 |
| 4,185,487 A | 1/1980 | Merideth | 72/315 |

(List continued on next page.)

FOREIGN PATENT DOCUMENTS

| | | | | |
|---|---|---|---|---|
| DE | 1659388 | * | 9/1969 | 285/424 |
| DE | 2258680 | * | 6/1974 | 285/424 |
| DE | 2221312 | * | 12/1979 | 285/424 |
| DE | 4224257 | * | 1/1994 | 285/424 |

OTHER PUBLICATIONS

"DW/142 Specification For Sheet Metal Ductwork"; Heating and Ventilating Contractors' Association, 1982 (p. 31).
"HVAC Duct Construction Standards Metal and Flexible"; Sheet Metal and Air Conditioning Contractors' National Association, Inc., Second Edition, 1995 (pp. 7.2, 7.3, 7.6 & 7.7).

(List continued on next page.)

Primary Examiner—Eric K. Nicholson
(74) Attorney, Agent, or Firm—Blackwell Sanders Peper Martin LLP

(57) ABSTRACT

A duct assembly made from multiple duct sections for transporting pressurized fluid therethrough which can be formed simply by laborers at a building site or elsewhere and has a strong joint resistant to leakage. The joint rigidizes each duct section and the duct assembly, permitting duct assemblies including a greater number of joined duct sections to be put together and lifted into place The joint is formed by passing fasteners through a corner flange connection member associated with one duct section, through integral flanges of the one duct section and other duct section arranged in end-to-end relation with the one duct section, and through a corner flange connection member associated with the other duct section. The act of installing the fastener tightly pulls together the integral flanges and makes and integral connection between them. Additional sealing may be provided applying a flowable sealant between the flanges before the fasteners are tightened to bring the integral flanges of the duct sections into clamping relationship. The joint can be formed using conventional corner pieces which are modified to accept fasteners simultaneously through the corner pieces and integral flanges of the duct section. A method of assembly and a corner flange connection member are also disclosed.

16 Claims, 26 Drawing Sheets

U.S. PATENT DOCUMENTS

| | | | | |
|---|---|---|---|---|
| 4,218,079 A | * | 8/1980 | Arnoldt | 285/424 |
| 4,244,609 A | * | 1/1981 | Smitka | 285/405 |
| 4,261,098 A | | 4/1981 | Lincoln | 29/809 |
| 4,283,080 A | * | 8/1981 | Nakajima | 285/405 |
| 4,332,203 A | | 6/1982 | Flowers | 105/422 |
| 4,410,206 A | | 10/1983 | Mez | 285/405 |
| 4,466,641 A | | 8/1984 | Heilman et al. | 285/406 |
| 4,507,836 A | | 4/1985 | Hiromitsu | 29/252 |
| 4,537,430 A | * | 8/1985 | Sullivan | 285/424 |
| 4,558,892 A | * | 12/1985 | Daw et al. | 285/424 |
| 4,564,227 A | | 1/1986 | Murck | 285/364 |
| 4,572,553 A | | 2/1986 | Geldner | 285/363 |
| 4,579,375 A | | 4/1986 | Fischer et al. | 285/363 |
| 4,713,959 A | | 12/1987 | Bennett | 72/410 |
| 4,725,083 A | * | 2/1988 | Schauer | 285/405 |
| 4,870,749 A | | 10/1989 | Roy et al. | 29/798 |
| 4,989,438 A | | 2/1991 | Simon | 72/325 |
| 5,069,484 A | * | 12/1991 | McElroy | 285/405 |
| 5,090,101 A | | 2/1992 | Welty | 29/243.5 |
| 5,165,730 A | * | 11/1992 | McElroy | 285/424 |
| 5,283,944 A | | 2/1994 | Goodhue | 29/701 |
| 5,321,880 A | | 6/1994 | Goodhue | 29/509 |
| 5,342,100 A | | 8/1994 | Goodhue | 285/363 |
| 5,353,616 A | | 10/1994 | Fischer et al. | 72/51 |
| 5,358,013 A | | 10/1994 | McClain | 138/109 |
| 5,448,815 A | | 9/1995 | Kolesar | 29/243.5 |
| 5,495,652 A | | 3/1996 | Kitamura et al. | 29/243.5 |
| 5,564,758 A | * | 10/1996 | Tiberio | 285/405 |
| 5,621,956 A | | 4/1997 | Kolesar | 29/243.5 |
| 5,649,347 A | | 7/1997 | Cattadoris | 29/252 |
| 5,673,947 A | | 10/1997 | De Waal | 285/364 |
| 5,926,937 A | | 7/1999 | Goodhue | 29/509 |
| 6,047,466 A | | 4/2000 | Karpman et al. | 29/809 |
| 6,081,985 A | | 7/2000 | Fischer et al. | 29/509 |

OTHER PUBLICATIONS

"Ideas that Work for you Every Day"; reprinted from SMACNA Higher Pressure Manual (No Date).

"HVAC Duct Construction Standards Metal and Flexible"; Sheet Metal and Air Conditioning Contractors' National Association, Inc., 4201 Lafayette Center Drive, Chantilly, VA 20150–1209, Second Edition, 1995 with Addendum No. 1 Nov. 1997 (pp. 1.80 & 1.81).

* cited by examiner

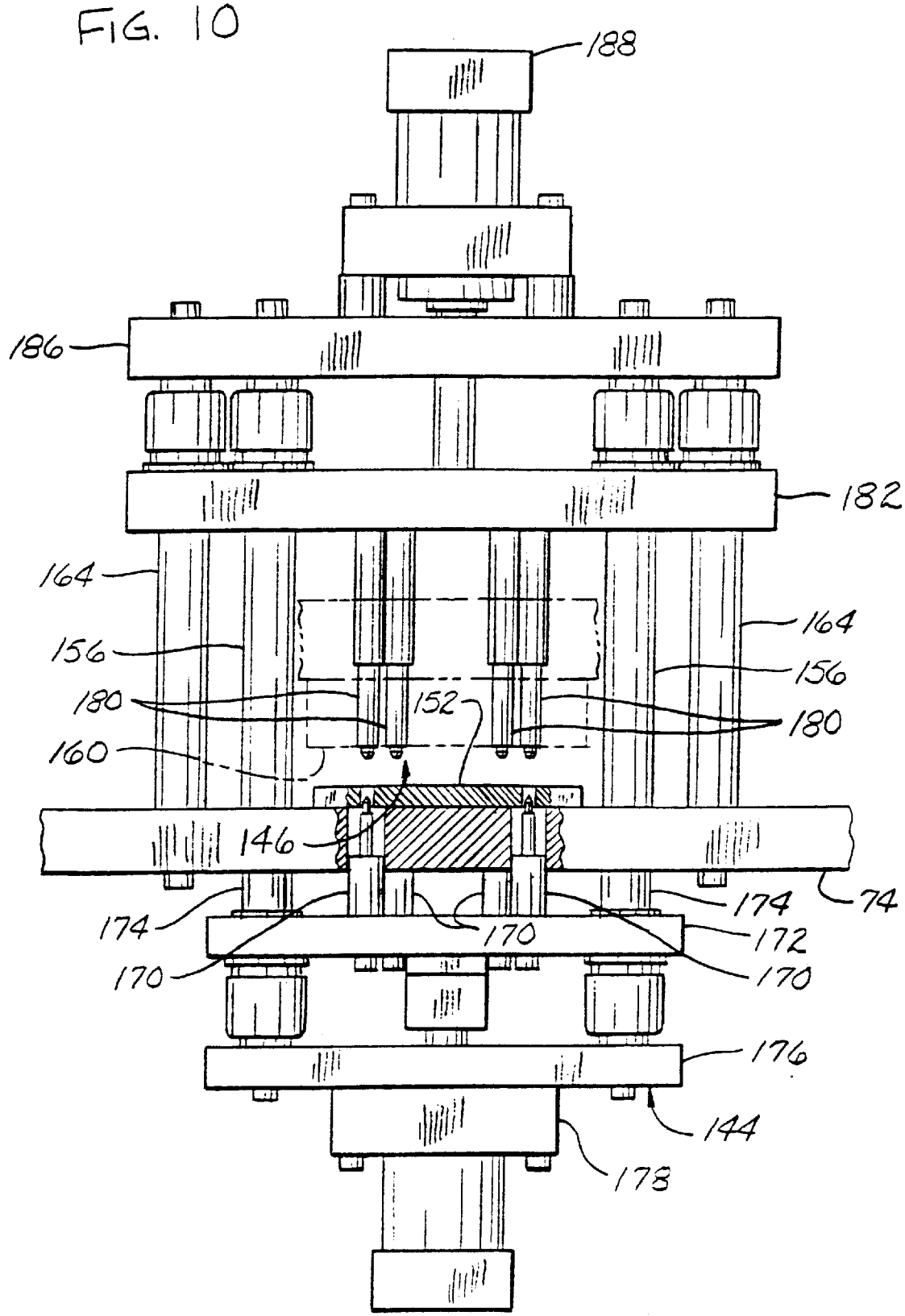

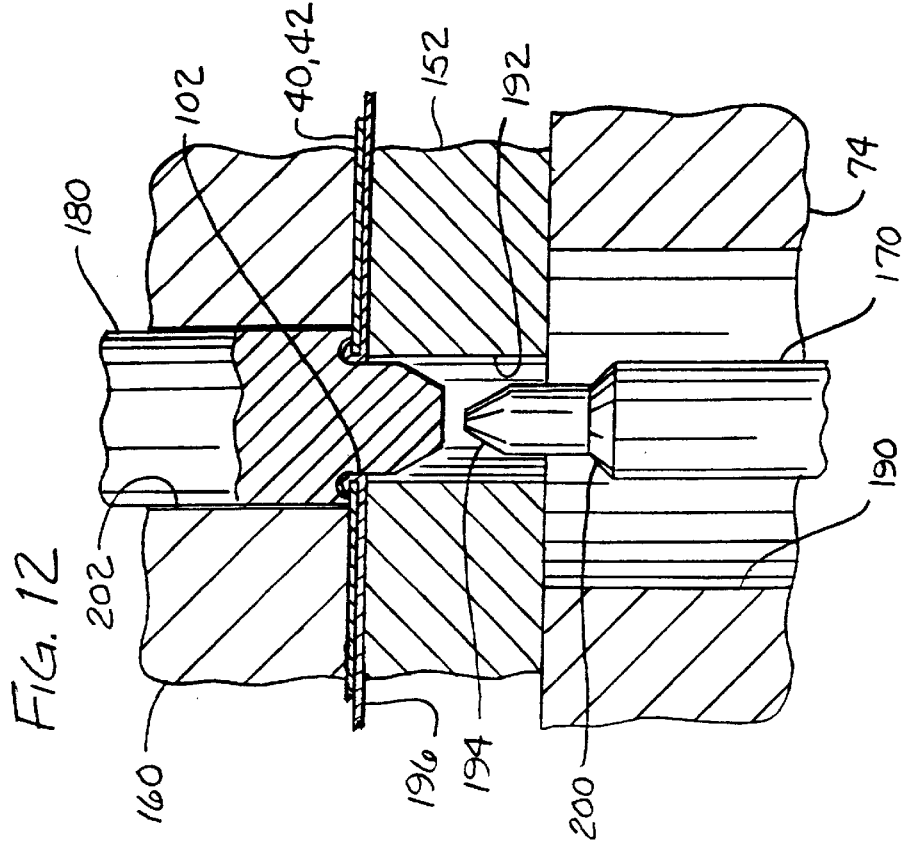
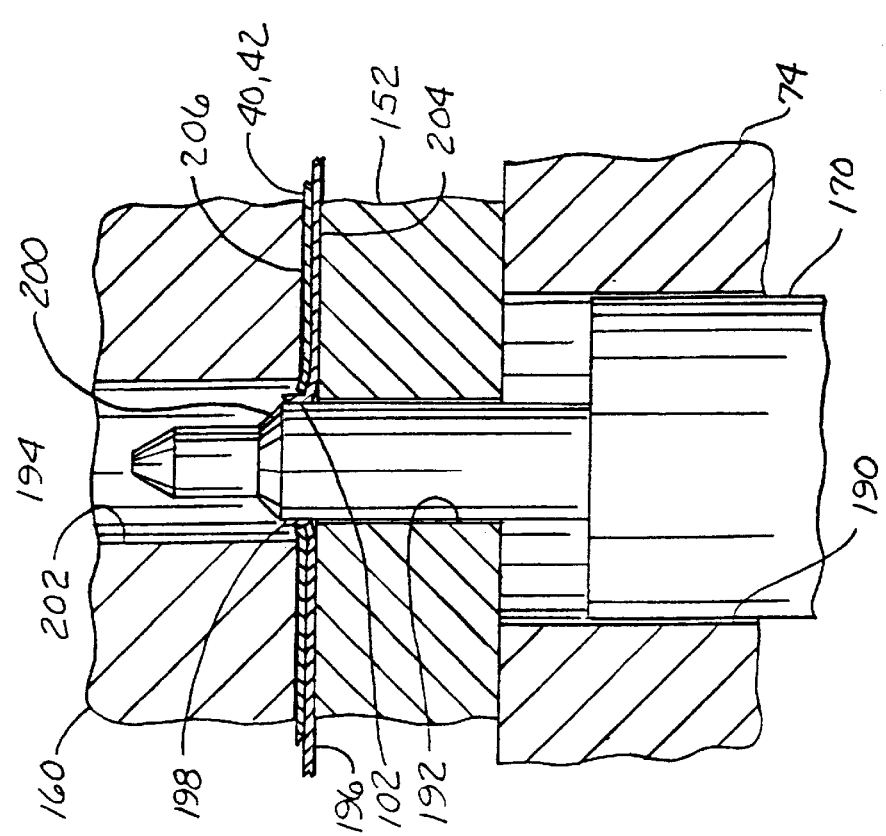

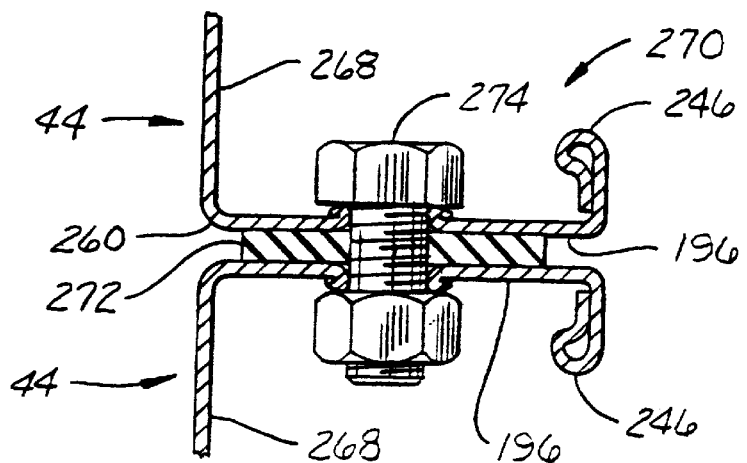
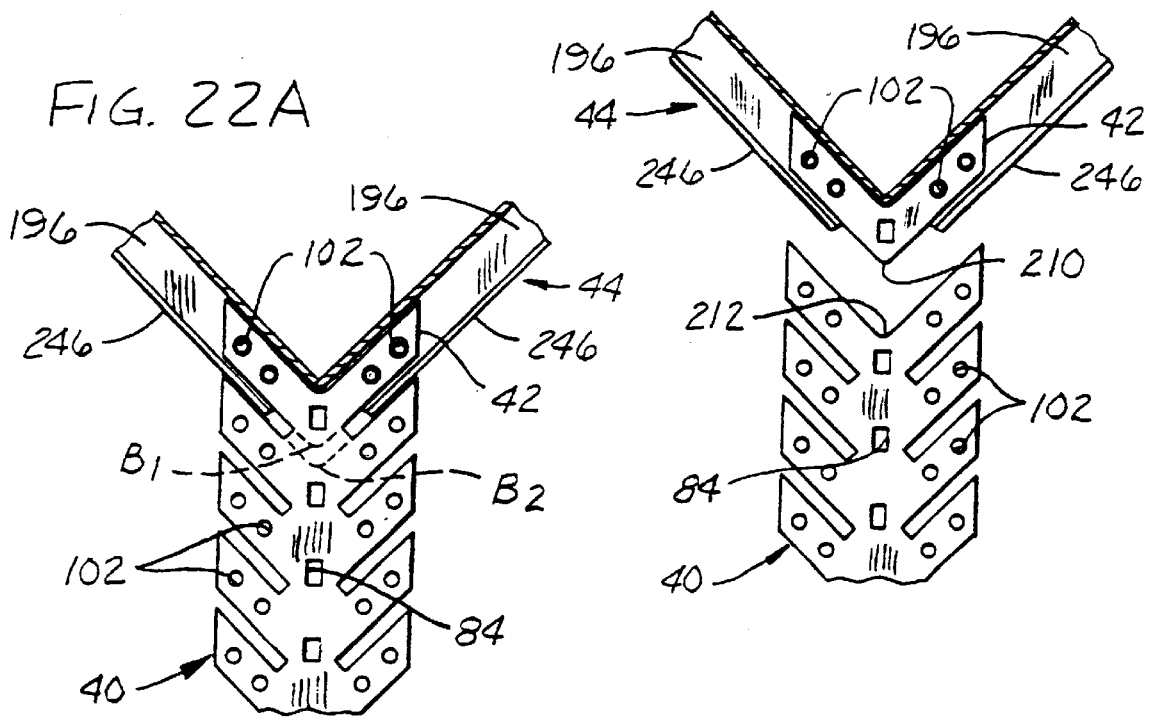

COMPANION DUCT FLANGES

This is a continuation-in-part of U.S. patent application Ser. No. 09/495,200, filed Jan. 31, 2000.

BACKGROUND OF THE INVENTION

The present invention relates generally to duct assemblies for transporting pressurized fluid such as heating and cooling air, and more particularly to a duct assembly having robust corner connections and a method of making such a duct assembly.

Duct assemblies used to transport pressurized fluid in buildings (e.g., for forced air HVAC systems) are conventionally formed in sections and secured together to form longer spans as needed. A duct section is typically formed of sheet metal into a rectangular shape having four sides and bent or seamed corners at the intersections of the sides. A flange extends essentially perpendicularly outward from each side at both ends of the duct section. The sections are positioned end-to-end so the flanges of one section align with the flanges of the adjacent section and the aligned flanges are fastened together to form the duct assemblies. The flanges which are formed as part of each duct section are not continuous. Rather, there are gaps at each place on the duct sections where adjacent flanges meet for manufacturing convenience. Stamped corner pieces are inserted in channels formed in each flange so they span the gap at each place on the duct section where adjacent flanges meet. When the duct sections are positioned end-to-end, the stamped corner pieces of one duct section are aligned with stamped corner pieces of the adjacent duct section. Fasteners are inserted through holes extending through the stamped corner pieces to clamp the duct sections together. Frequently, gaskets are placed between aligned flanges to achieve an airtight seal and clips are used to hold the aligned flanges together between the stamped corner pieces.

Stamped corner pieces are sometimes inserted in the duct section at one location and transported to another location for attachment to other duct sections to form duct assemblies. The corner pieces are snapped into the flanges, which are formed with return bends at their free ends to bear against the corner piece with a spring force to hold the corner pieces in the flange. It is also known to press in the corner pieces and crimp over the return bends of the flanges to secure them. However in many cases, the snap connection of the corner piece into the flange is not completely secure, even when crimping is used. Not only does this allow the corner pieces to become separated from the flanges more easily, but it also allows adjacent flanges of the duct assembly to move independently of each other. When the corner pieces become separated from the flanges, additional time is required to reinsert the corner pieces in the flanges. Moreover, if the corner pieces become separated when the duct sections are overhead, the corner pieces can fall on workers below. Still further, if the corner pieces move independently from the flanges, adjacent flanges of the duct assembly can move independently from each other permitting the duct sections to move with respect to each other thereby allowing fluid to leak from between the joints. Several connection systems are commercially available. Many of these require unique components (e.g., special corner pieces) or special equipment to connect the duct sections. In many applications, a separate gasket must be secured between the sections for sufficient sealing, which complicates assembly and increases the chances for faulty assembly. Finally, the insertion of the corner pieces into the flanges provides no rigid interconnection of adjacent flanges and therefore minimal angular rigidity to the joint between the duct sections or to the duct assembly.

SUMMARY OF THE INVENTION

Among the several objects and features of the present invention may be noted the provision of a duct assembly which has improved strength at its joint; the provision of such a duct assembly which maintains a tight seal at the joint; the provision of such a duct assembly which has fewer parts constituting the joint; the provision of such a duct assembly which does not require a gasket; the provision of such a duct assembly which can use modified conventional corner pieces to form the joint connection; the provision of a corner flange connection member for use in the duct assembly which does not require connection to the duct section prior to assembly of the joint; the provision of a method for quickly and inexpensively interconnecting duct sections; the provision of such a method of assembly which does not require insertion of a corner flange connection member or corner piece to a duct section prior to final assembly of the joint; the provision of such a method of assembly which permits the duct sections to be shipped to the site in a compact, broken down configuration; and the provision of such a method of assembly which can be carried out at the building site with equipment on hand.

Briefly, a duct assembly of the present invention for transporting pressurized fluid therethrough comprises duct sections, each having sides extending between opposite ends. Each of the sides joins an adjacent side and has an integral flange extending laterally outward from each end. The integral flanges and sides are formed as one piece from sheet metal material. The duct sections are disposed in end-to-end relation with the integral flanges of one duct section generally in registration with the integral flanges of the other duct section to define a joint. Fasteners pass through the aligned flanges for attaching the duct sections in generally sealing relation at the joint.

In another aspect of the present invention, a corner flange connection member is capable of attachment to a duct section having sides extending between opposite ends. Each of the sides joins an adjacent side and has an integral flange extending laterally outward from each end. The integral flange on each side is adjacent to the integral flange of the adjacent side at each end of the duct section. The corner flange connection member comprises a first leg and a second leg extending generally at angles relative to each other so that when the corner flange connection member is installed at adjacent flanges at an end of the duct section, a first leg overlies a first of the adjacent integral flanges and a second leg overlies a second of the adjacent integral flanges. The first leg has a first hole therein located on the first leg for overlying the first integral flange and the second leg has a first hole therein located on the second leg for overlying the second integral flange. The first holes are adapted to receive fasteners therethrough for joining the integral flanges of the duct section to integral flanges of another duct section.

In still another aspect of the present invention, a method of assembling two duct sections in end-to-end relation is disclosed. Each duct section has sides extending between opposite ends of the duct section and joins an adjacent side of the duct section. The duct section side has an integral flange extending laterally outward from each end. The integral flanges and sides are formed as one piece from sheet metal material. Each integral flange is adjacent to another of the integral flanges where sides meet at each end of the duct section. The method comprises the steps of arranging the duct sections in generally end-to-end relation with each other such that the integral flanges of one duct section are generally aligned with integral flanges of the other duct section, inserting fasteners through corresponding holes in both of the aligned integral flanges, and tightening the fasteners to secure the duct sections together.

Other objects and features of the present invention will be in part apparent and in part pointed out hereinafter.

BRIEF DESCRIPTION OF THE DRAWINGS

FIG. 10 is a cross section of the apparatus similar to FIG. 9 but having a fixture removed;

FIG. 11 is a schematic detail of FIG. 10 showing a piercing tool;

FIG. 12 is a schematic detail of FIG. 10 showing a flaring tool;

FIG. 21 is a cross section of the duct assembly of FIG. 20 taken in the plane including line 21—21;

FIGS. 22A and 22B schematically illustrate attachment of a patterned strip to a duct flange and separation of an element from the strip;

Corresponding reference characters indicate corresponding parts throughout the several views of the drawings.

DETAILED DESCRIPTION OF THE PREFERRED EMBODIMENT

Figure 1:
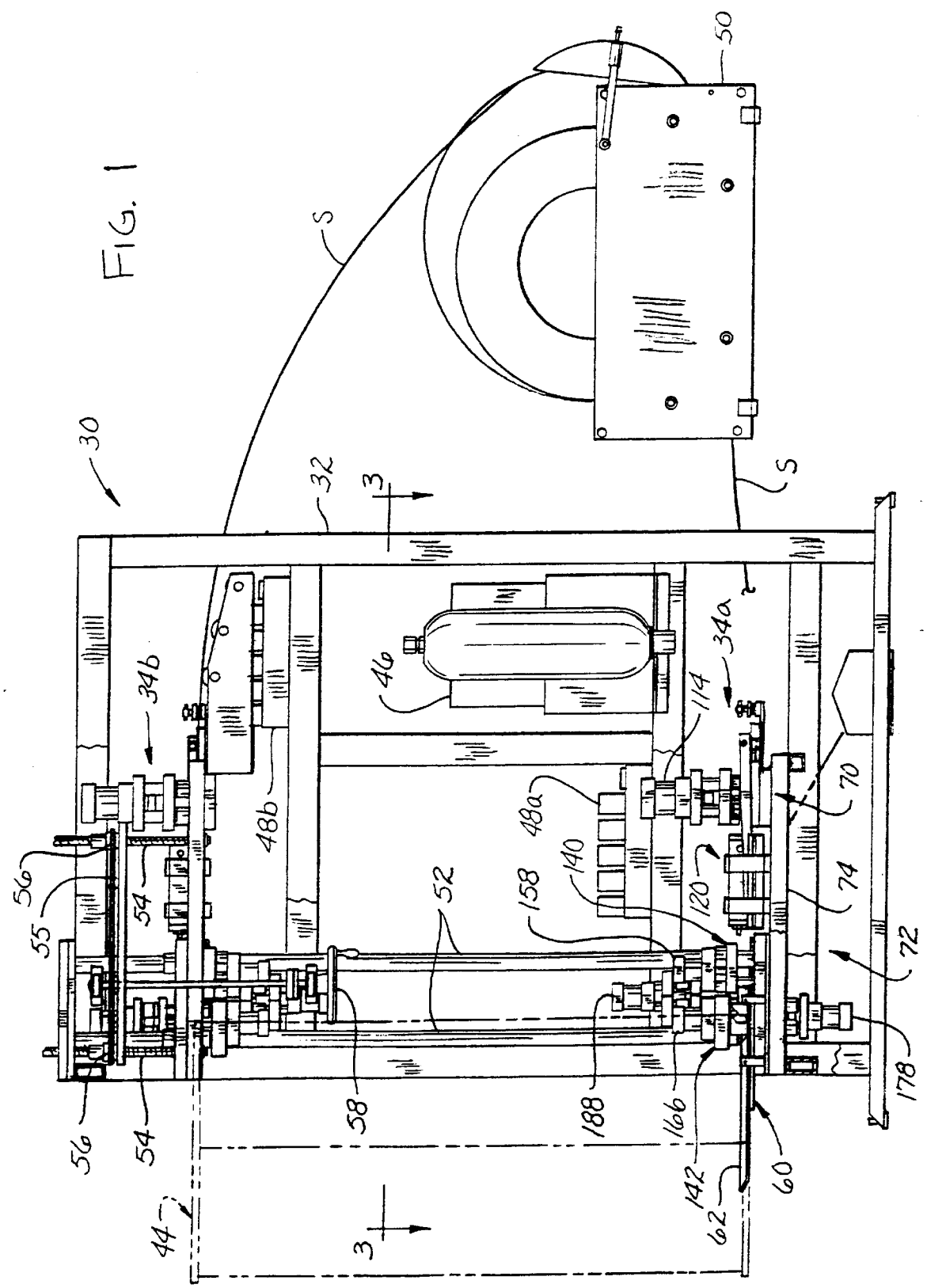
FIG. 1 is a side elevation of an apparatus of the present invention for preparing duct sections for assembly.

Referring now to the drawings and in particular to FIG. 1, apparatus for making a patterned strip and for attaching leading edge portions of the patterned strip to flanges on sections of duct is designated in its entirety by the reference numeral 30. The apparatus 30 includes a frame 32 supporting a stationary lower mechanism, generally designated 34a, and a moveable upper mechanism, generally designated 34b. Parts of the frame 32 have been broken away in FIG. 1 to fully reveal the mechanisms 34a, 34b. Each of the mechanisms 34a, 34b makes a patterned strip, generally designated by 40, of elements 42 (FIG. 17) from strips of steel S and attaches the patterned strip at one of the elements to flanges of sections of duct, generally designated by 44. The strip 40 is separated from the element 42 attached to the flanges of the duct section 44 by the apparatus. A conventional hydraulic supply 46 is mounted on the frame 32 for supplying the upper and lower mechanisms 34b, 34a with pressurized hydraulic fluid through hydraulic lines (not shown for clarity of illustration). Conventional controls 48a, 48b regulate flow of fluid delivered to the mechanisms 34a, 34b, respectively. It is noted that the hydraulic controls are shown at 48a, 48b but that a conventional PLC programmed to operate the hydraulic controls is not shown. A conventional double coil holder 50 mounted adjacent the frame 32 supplies strips of steel to the mechanisms 34a, 34b. As the frame 32, the hydraulic supply 46, the controls 48a, 48b, and the coil holder 50 are conventional, they will not be described in further detail.

Figure 2:
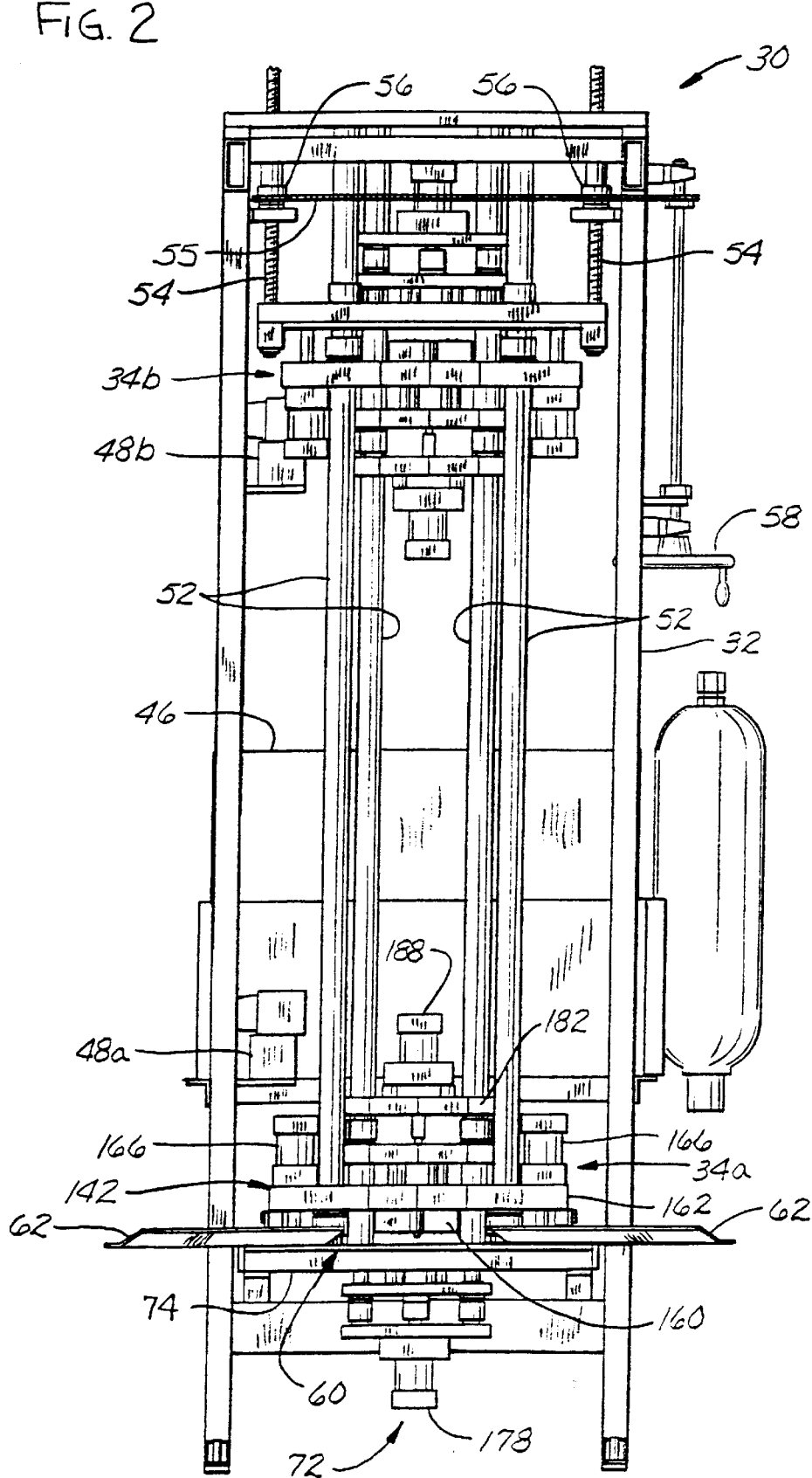
FIG. 2 is a front elevation of the apparatus of FIG. 1.

As illustrated in FIGS. 1 and 2, the upper mechanism 34b is slidably mounted on four vertical posts 52 extending upward from the lower assembly 34a to accommodate duct sections 44 having differing lengths. Screw shafts 54 are provided between the frame 32 and the upper mechanism 34b for moving the mechanism up and down along the posts 52. The shafts 54 are turned by a chain 55 engaging sprockets 56 mounted on the shafts. A crank 58 rotatably mounted on the frame 32 drives the chain 55 for raising and lower the upper mechanism 34b.

Figure 3:
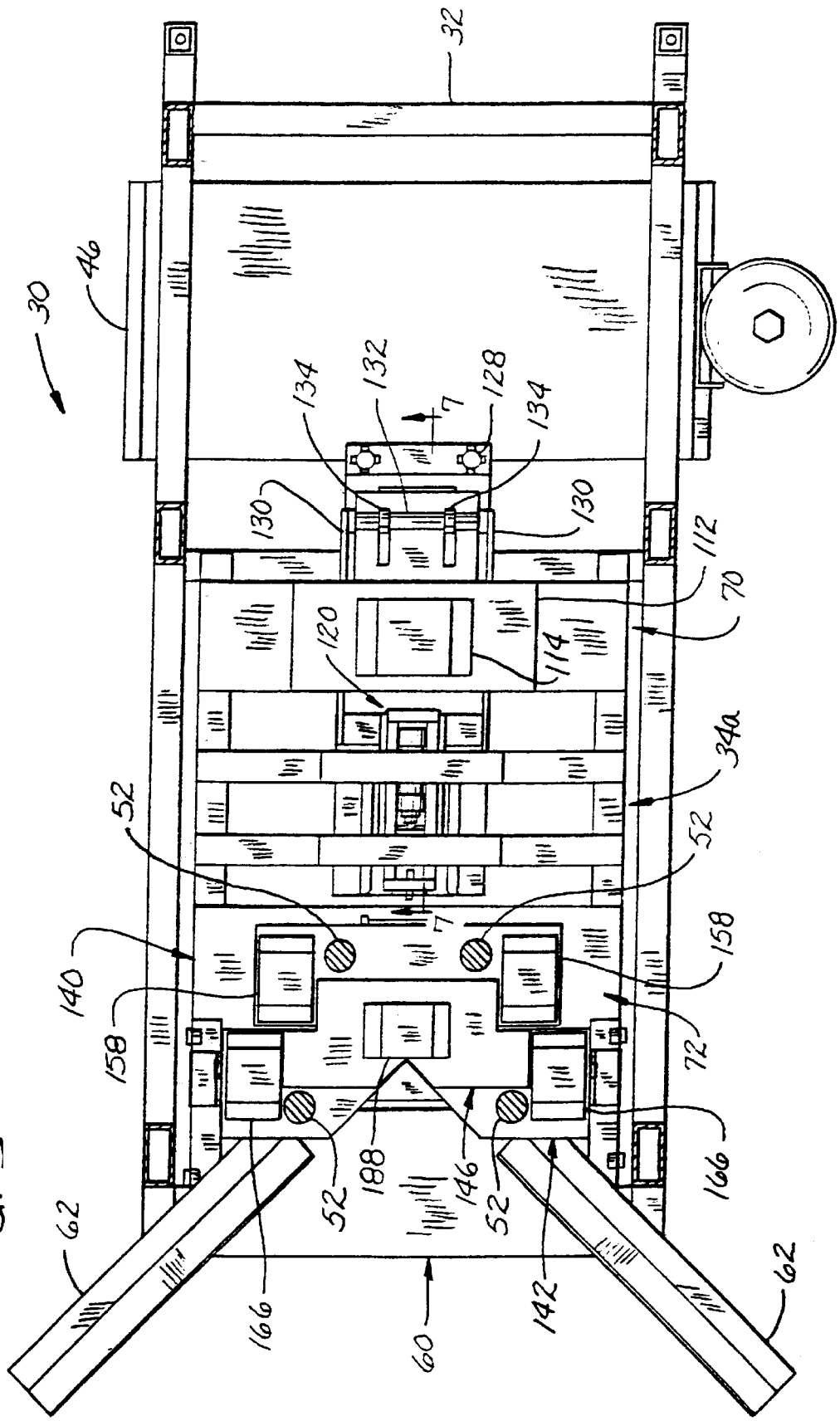
FIG. 3 is a cross section of the apparatus taken in the plane of line 3—3 of FIG. 1.

FIG. 3 illustrates a lower portion of the apparatus 30 including the lower mechanism 34a. The upper mechanism 34b is identical to the lower mechanism 34a except the lower mechanism includes a support, generally designated by 60, for supporting the duct section 44 as the mechanisms attach the patterned strip 40 (FIG. 17) to the flanges of the duct section. The duct section 44 is turned on end and placed into the apparatus 30 so that a pair of adjacent flanges at the lower end of the duct section is received by the lower mechanism 34a and a opposite pair of adjacent flanges at the upper end of the duct section is received in the upper mechanism 34b. The lower end of the duct section 44 rests on and is supported by the support 60 during the operations of fastening the patterned strip 40 to adjacent flanges 196 of the duct section and shearing the attached leading element 42 of the strip from the remainder of the strip. The support 60 includes guides 62 for aligning the duct section 44 on the support and for guiding a strip 40 of connector elements 42 toward a location where they will be attached to the duct flange. The support 60 also includes a gripping mechanism, generally designated by 64 (FIG. 13), for holding the duct section 44 against the guides 62 to ensure proper alignment of the elements 42 and the duct section 44 as they are attached as will be explained in greater detail below. Since the upper and lower mechanisms 34b, 34a are substantially identical in all other respects, only the lower mechanism will be described in further detail.

Figure 4:
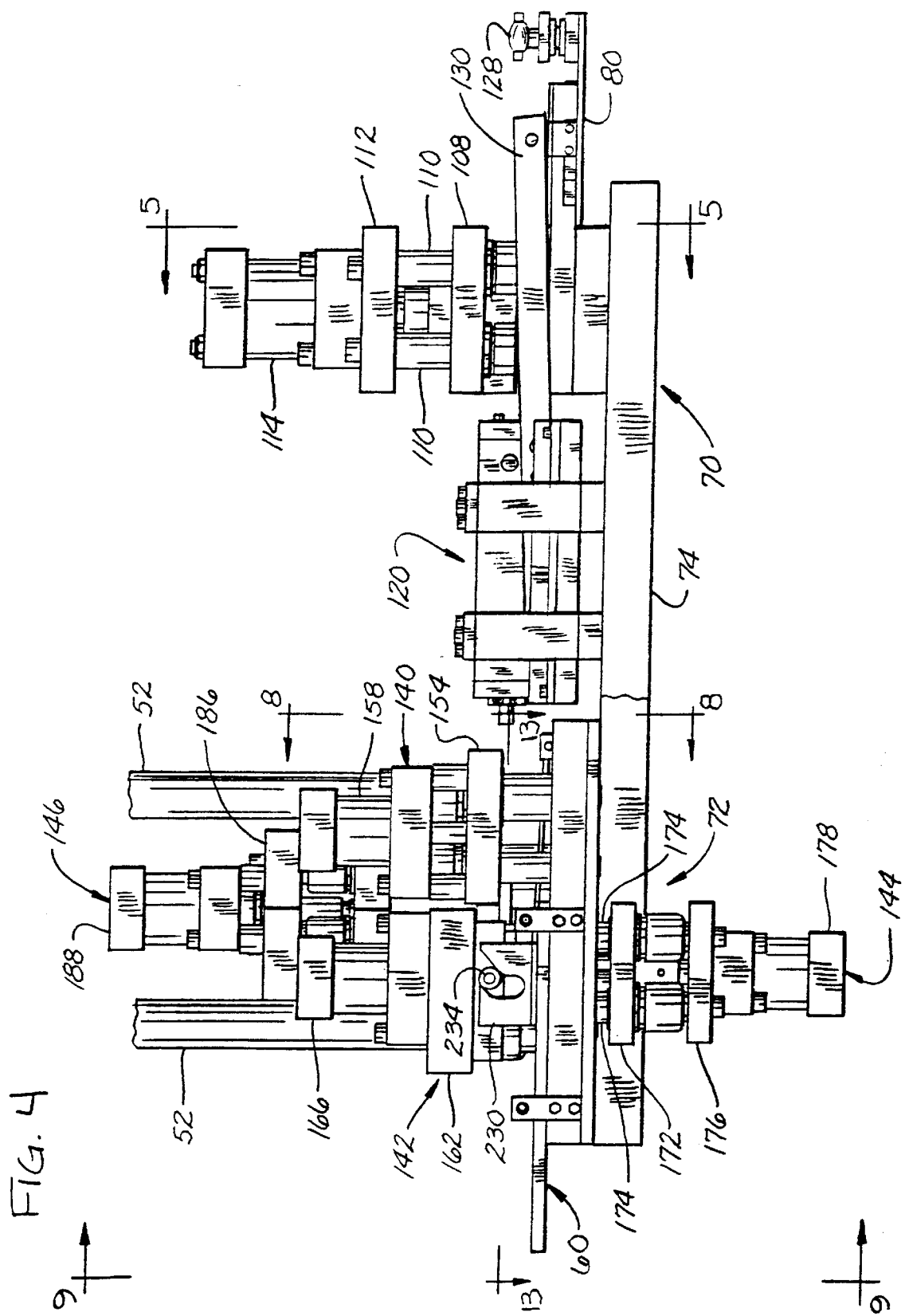
FIG. 4 is an enlarged detail of the apparatus of FIG. 1.

As illustrated in FIG. 4, the lower mechanism 34a generally comprises a strip patterning apparatus (generally designated by 70) for making a patterned strip 40 of elements 42 (FIG. 17) from the steel strip S, and a fastening apparatus (generally designated by 72) for attaching the patterned strip 40 (particularly at a leading edge portion defined by one of the elements 42) to a flange 196 of a section of duct 44 and separating the attached element from the strip. In the preferred embodiment, the strip 40 is fastened to flanges 196 (FIG. 18) formed as one piece with the duct section 44 at each end of the duct section. However, it is envisioned that the flanges 196 may be separately made and attached to the duct section 44, or that the strip 40 could be attached to the duct section in ways equivalent to attachment to the flanges. The guides 62 have been removed from FIG. 4 for clarity of illustration. It is noted that the fastening apparatus 72 of the lower mechanism 34a is inverted relative to the position occupied by the corresponding fastening apparatus of the upper mechanism 34b. The construction is otherwise the same, but the inverted orientations accommodate the need to move the strip 40 upward into engagement with the flange in the upper mechanism 34b and downward into engagement with the flange in the lower mechanism 34a.

Figure 5:
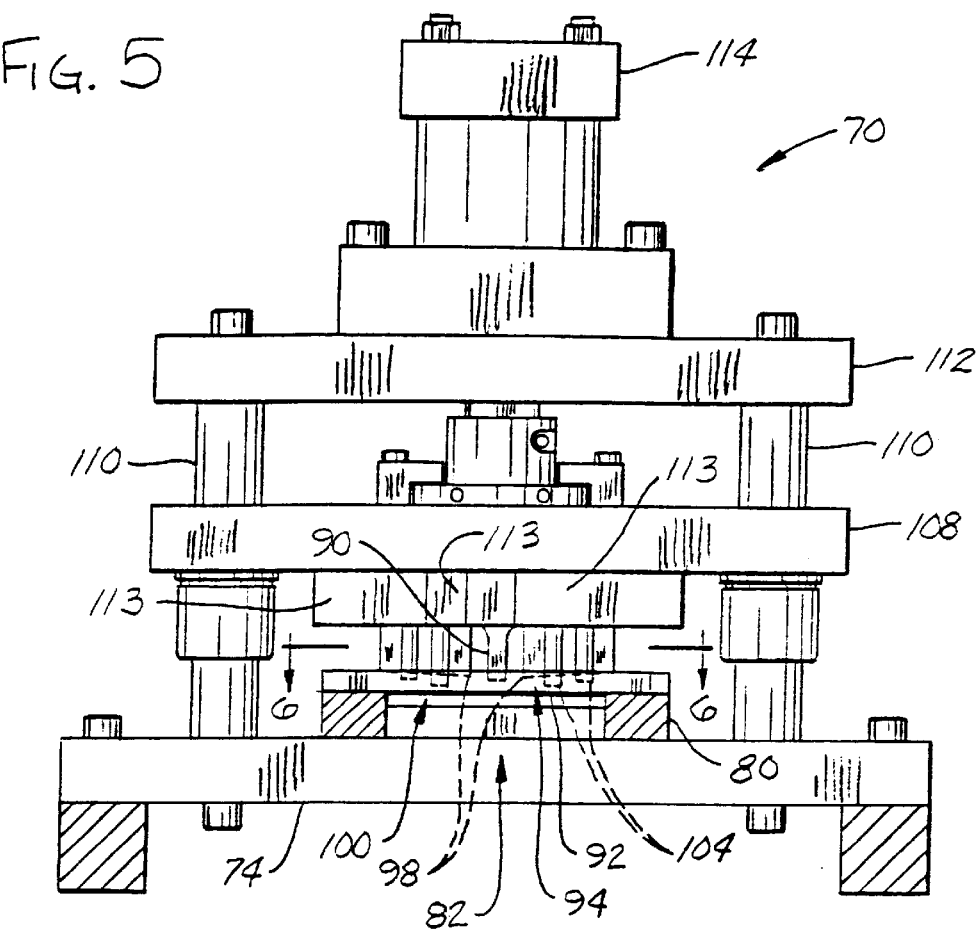
FIG. 5 is a section of the apparatus taken in the plane of line 5—5 of FIG. 4.
Figure 6:
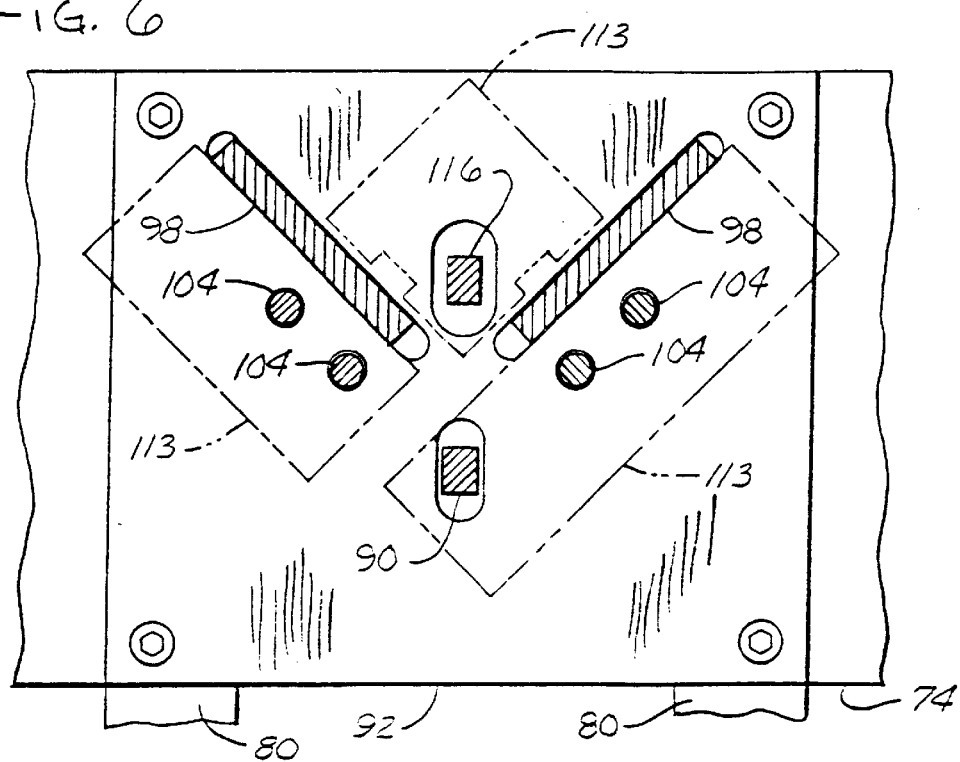
FIG. 6 is a fragmentary section of the apparatus taken in the plane of line 6—6 of FIG. 5.
Figure 17:
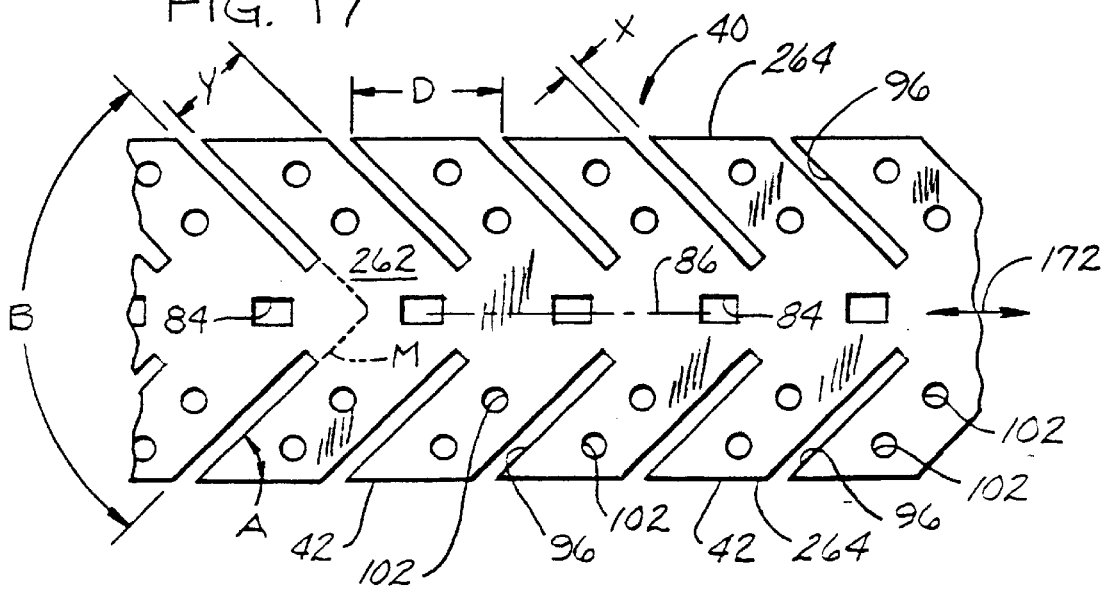
FIG. 17 is a fragmentary top plan of a patterned strip of the present invention.
Figure 18:
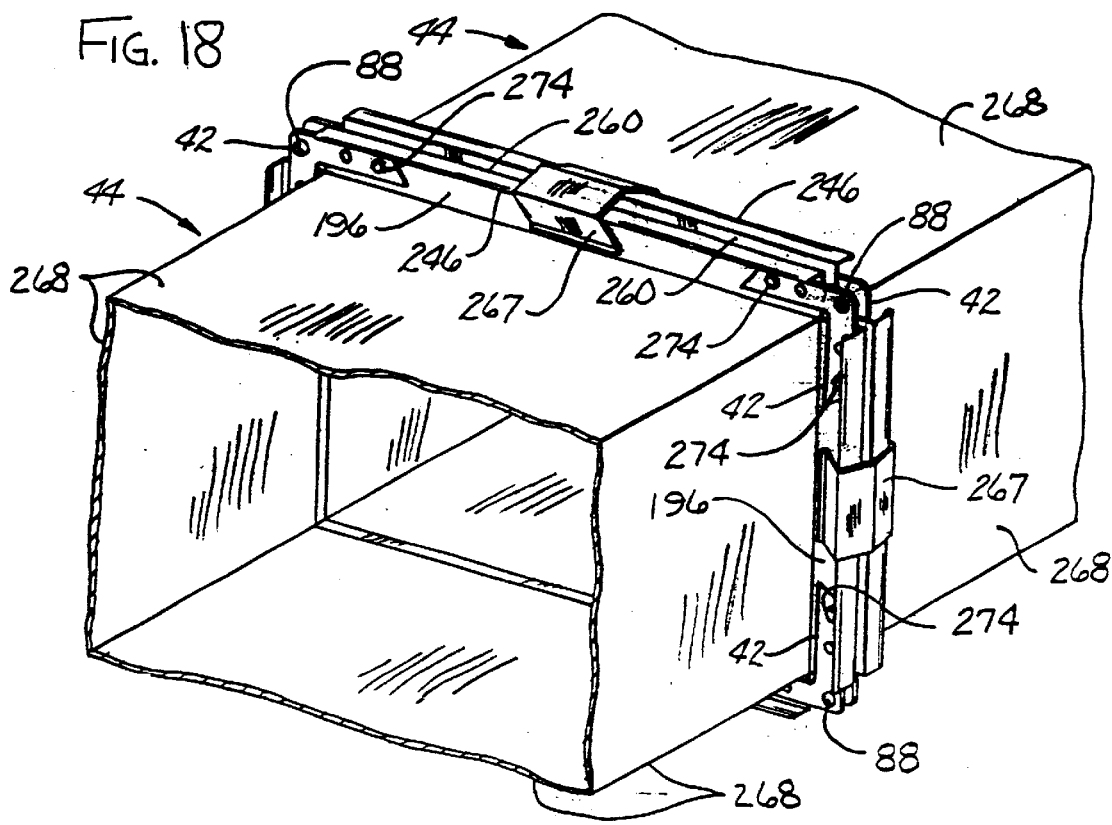
FIG. 18 is a fragmentary perspective of the duct assembly.

The patterning apparatus 70 and the fastening apparatus 72 of the lower mechanism 34a are mounted on a base 74 which is attached to the frame 32. As shown in FIG. 5, the patterning apparatus 70 includes a guide 80 for guiding the strip 40 of elements 42 in a longitudinal direction 172 (FIG. 17). The apparatus 70 has an aperture forming tool, generally designated by 82, arranged relative to the guide 80 for punching rectangular apertures 84 (FIG. 17) along a longitudinal centerline 86 of the strip 40 (FIG. 17). The apertures 84 accept fasteners 88 to connect sections of duct 44 in end-to-end relation (FIG. 18). The aperture tool 82 includes a punch 90 and a die 92 as shown in FIG. 5. In addition, the apparatus 70 has a slotting tool, generally designated by 94, arranged relative to the guide 80 for making laterally spaced pairs of elongate slots 96 in the strip 40 (FIG. 17). These slots 96 define the elements 42 within the strip 40 (FIG. 17). The tool 94 punches the slots 96 so the elements 42 remain attached to the strip 40. The slot forming tool 94 includes a pair of elongate punches 98 which engage the die 92 as shown in FIG. 5. The patterning apparatus 70 also includes a hole forming tool 100 arranged relative to the guide 80 for making holes 102 between adjacent slots 96 for facilitating connection of the strip 40 (FIG. 17) to the flanges 196 of the section of duct 44. The hole forming tool 100 includes four punches 104 which engage the die 92 as shown in FIG. 6.

As illustrated in FIG. 5, the punches 90, 98, 104 extend downward from a common carriage plate 108 which is slidably mounted on vertical posts 110 extending upward from the base 74 to a mounting plate 112. The punches 90, 98, 104 are held by respective mounting blocks 113 attached to the carriage plate 108. A conventional hydraulic actuator 114 connected between the mounting plate 112 and the carriage plate 108 moves the carriage plate to engage the punches 90, 98, 104 with the die 92 in response from a signal from the control 48a. Further, a drift 116 (FIG. 6) extends downward from the carriage plate 108 for engaging one of the previously made apertures 84 in the patterned strip 40 to ensure proper spacing of the apertures 84, slots 96 and holes 102 being made in the strip by the punches 90, 98 and 104, respectively.

Figure 7:
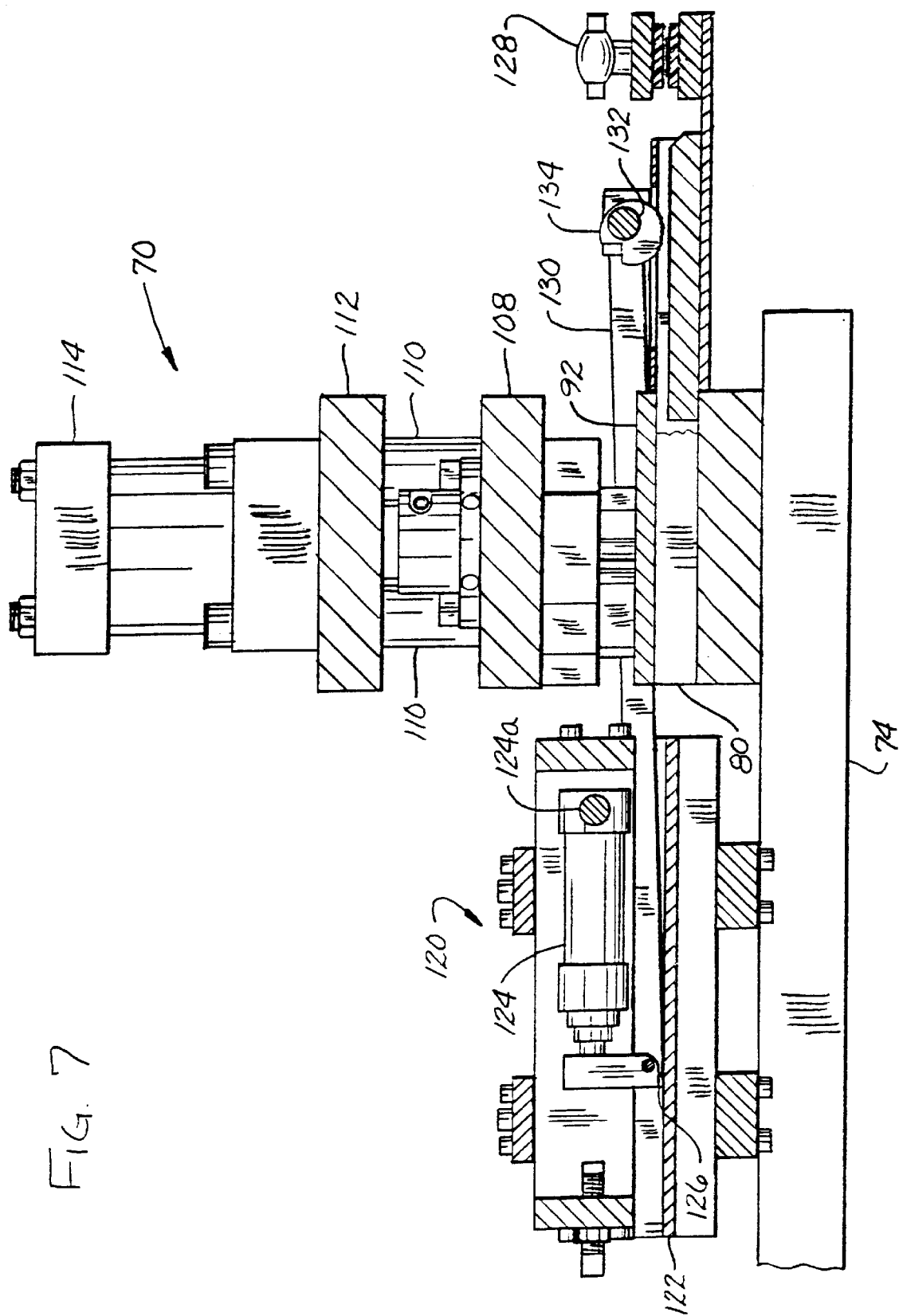
FIG. 7 is a fragmentary section of the apparatus taken in the plane of line 7—7 of FIG. 3.

As illustrated in FIG. 7, the patterning apparatus 70 also includes an indexing device, generally designated by 120, for indexing the strip S a predetermined longitudinal distance D (FIG. 17) before making subsequent apertures 84, slots 96 and holes 102 in the patterned strip 40. The indexing device 120 also simultaneously moves the patterned strip 40 into the fastening apparatus 72. Because the indexing device 120 moves the strip 40 a predetermined distance D, the patterning apparatus 70 makes evenly spaced apertures 84, slots 96 and holes 102 along the strip. The indexing device 120 includes a platform 122 mounted on the base 74 and a hydraulic actuator 124 which is pivotally mounted by a pin 124a on the base so it moves generally parallel to the platform 122 in response to a signal from the control 48a. A tooth 126 at the end of the actuator 124 engages one of the apertures 84 in the strip 40 as the actuator extends to move the strip the predetermined longitudinal distance D forward (to the left as shown). The tooth 126 disengages the aperture 84 in the strip 40 as the actuator 124 retracts. The actuator 124 pivots upward and the tooth 126 slides over the upper surface of the strip 40 as the actuator retracts so the strip remains in position. A conventional adjustable drag brake 128 engages the strip 40 to ensure that the strip remains in position when the actuator 124 retracts.

In addition, two arms 130 (only one is shown in FIG. 7) extend rearward from the actuator 124 on opposite sides of the platform 122. As illustrated in FIG. 3, a shaft 132 is connected to the rearward ends of the arms 130. Toothed cams 134 mounted on the shaft 132 engage the strip 40 to initially advance the strip through the patterning apparatus 70 when the actuator 124 extends. Once the tooth 126 engages the first aperture 84 in the strip 40, the cams 134 may be manually pivoted on the shaft 132 so they do not engage the strip. Thus, the cams 134 may be used to start a new strip 40, but may be disengaged to prevent wear once the primary indexing device 120 engages the first aperture 84. In order to make an internal portion 212 of the first element, a manual trim of the strip 40 must be made along line M, as indicated in FIG. 17. Thereafter, the internal portion 212 is automatically made as will be described hereinafter.

Figure 8:
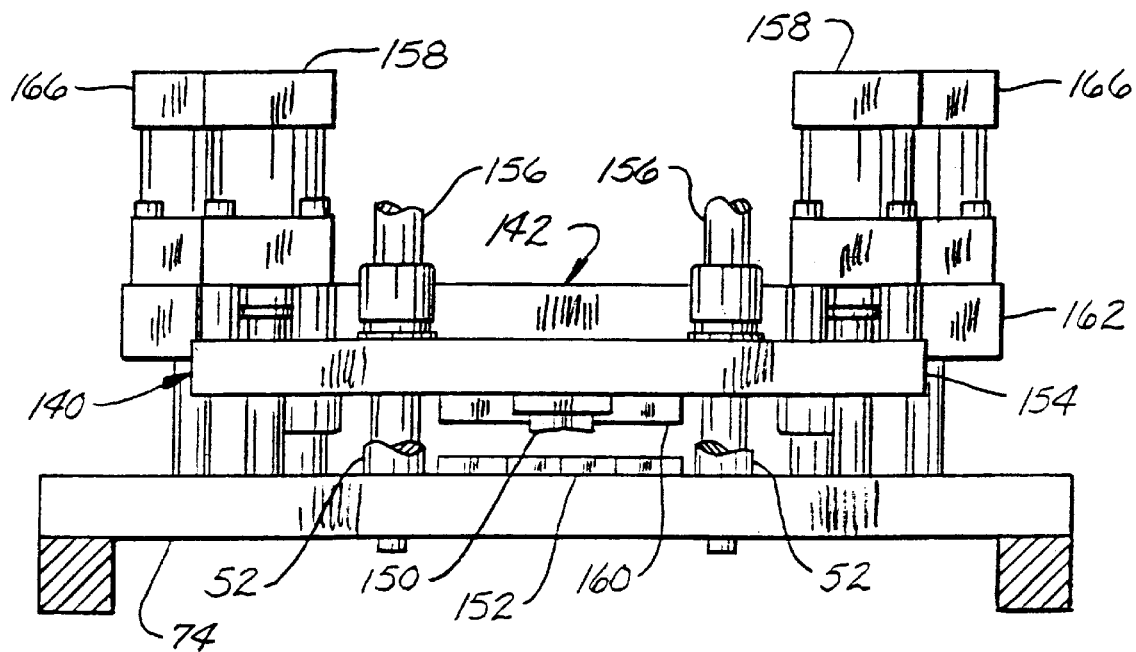
FIG. 8 is a section of the apparatus taken in the plane of line 8—8 of FIG. 4 with parts removed for clarity.

The fastening apparatus 72 generally comprises a shear (generally designated by 140), a fixture (generally designated by 142), a piercing unit (generally designated by 144) and a flaring tool (generally designated by 146) as shown in FIG. 4. As further illustrated in FIG. 8, the shear 140 includes a slot punch 150 and die 152 which are arranged relative to the fixture 142 for separating one of the elements 42 from the strip 40 after the piercing unit 144 and flaring tool 146 attach the strip to the flanges of the section of duct 44 as will be explained in further detail below. The slot punch 150 extends downward from a carriage plate 154 which is slidably mounted on two of the posts 52 extending between the upper and lower mechanisms 34a, 34b and two additional posts 156 (FIG. 13) extending upward from the base 74. A pair of conventional hydraulic actuators 158 connected between the carriage plate 154 and the base 74 move the carriage plate to drive the slot punch 150 past the die 152 in response to a signal from the control 48a.

Figure 9:
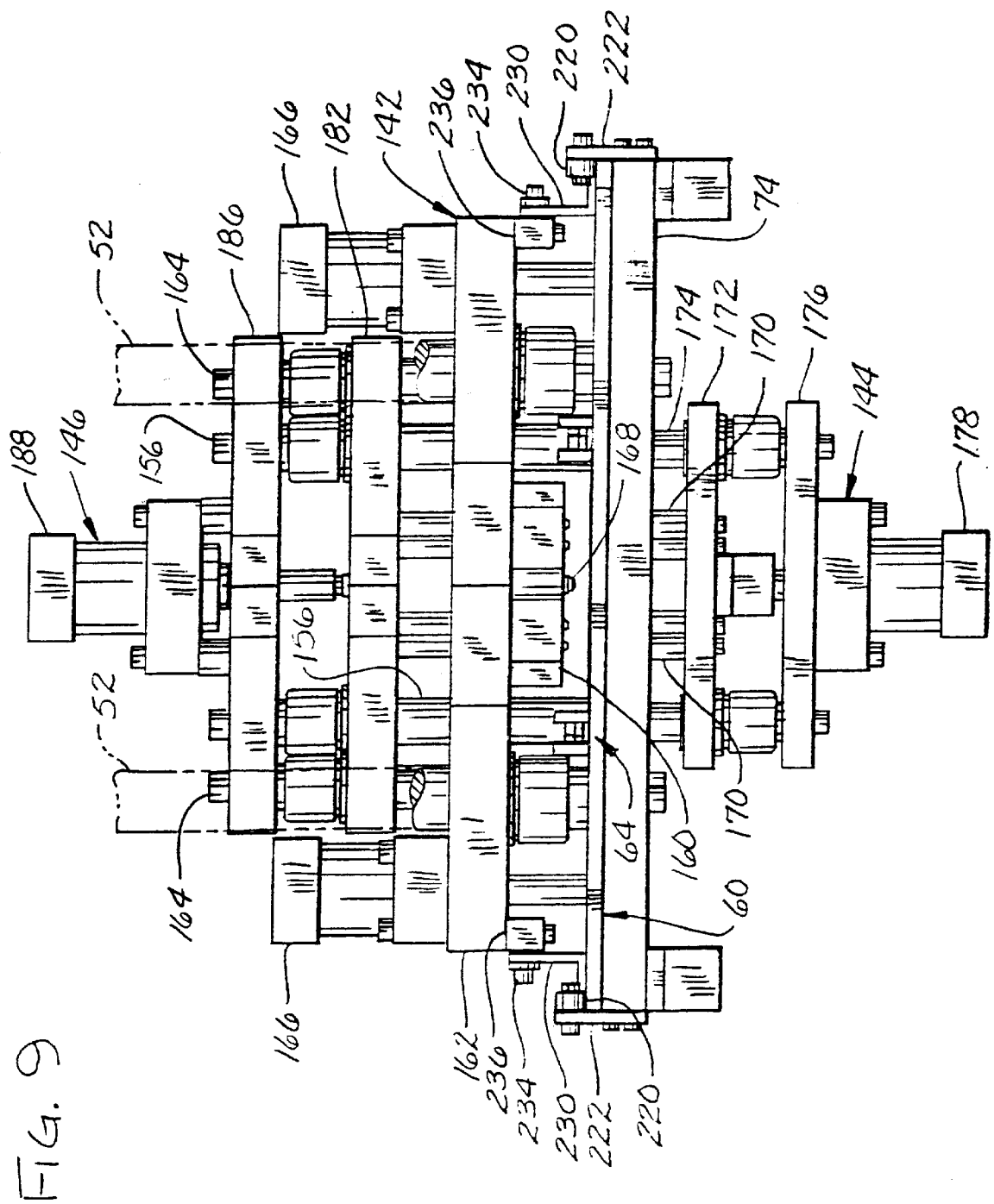
FIG. 9 is an end view of FIG. 4 seen from the vantage indicated by line 9—9 of FIG. 4.

As shown in FIG. 9, the fixture 142 includes a positioning block 160 for locating flanges of a section of duct 44 relative to the strip 40 of elements 42. The positioning block 160 extends downward from a carriage plate 162 which is slidably mounted on two of the posts 52 (FIG. 2) extending between the upper and lower mechanisms 34a, 34b and two additional posts 164 (FIG. 13) extending upward from the base 74. A pair of conventional hydraulic actuators 166 connected between the carriage plate 162 and the base 74 move the carriage plate and positioning block 160 up and down on the posts 52, 164. When in an upper most position as shown in FIG. 2, the positioning block 160 is spaced from the die 152 to permit the duct section 44 to be loaded and unloaded from the apparatus 30. When in a lowered position (not shown), the positioning block 160 holds the forward most element 42 and the flange 196 of the duct section 44 against the die 152. A pilot 168 (FIG. 9) mounted on a lower face of the positioning block 160 is provided to engage a leading aperture 84 in the strip 40 of elements 42 to ensure the leading element is properly positioned with respect to flanges of the section of duct 44.

FIG. 10 illustrates the piercing unit 144 and the flaring tool 146. The piercing unit 144 includes four piercing tools 170 mounted on a carriage plate 172 which is slidably mounted on four vertical posts 174 (only two are shown) extending downward from the base 74 to a mounting plate 176. A conventional hydraulic actuator 178 connected between the mounting plate 176 and the carriage plate 172 moves the carriage plate in response to a signal from the control 48a to push the piercing tools 170 through the flange 196 of the duct section 44 as will be explained in further detail below. The flaring tool 146 includes four swaging tools 180 mounted on a carriage plate 182 which is slidably mounted on the posts 156, 164 extending upward from the base 74 to a mounting plate 186. A conventional hydraulic actuator 188 connected between the mounting plate 186 and the carriage plate 182 moves the carriage plate in response from a signal from the control 48a to push the swaging tool 180 against the duct section flange 196 after it is pierced.

As illustrated in FIG. 11, when the piercing tools 170 move upward, they travel through openings 190 in the base 74 and openings 192 in the die 152. Each piercing tool 170 has a conical tip 194 which pierces a flange 196 of the duct section 44 and pushes a portion 198 of the duct flange 196 through a corresponding hole 102 in the patterned strip 40 of connector elements 42. A conical collar 200 is provided on the piercing tool 170 adjacent the tip 194 for deforming the flange 196 and strip 40 upward into a hole 202 in the positioning block 160. Thus, respective areas 204, 206 of the duct flanges 196 and the element 42 adjacent the hole 202 may be upset in a direction parallel to the pierced portion of the duct flange. In practice it has been found that only the area 204 of the duct flanges may be upset by the piercing action of the tool 170. Then the piercing tools 170 and swaging tools 180 simultaneously move downward to the position shown in FIG. 12. As this movement occurs, the swaging tools 180 flare the portion 198 of the flanges 196 pushed upward through the hole 102 in the strip 40 outward and downward against the strip to fasten the flanges of the section of duct and the strip to each other. The swaging tools 180 also at least partially flatten the upset areas 204, 206 of the section of flange 196 and the strip 40 (or at least of area 204 of the flange) at leading element 42 to tighten the connection between the duct and the strip. The flange material fits tightly against the element material thereby achieving an integral affixation of the strip 40 at the leading element 42 to the flange permitting no relative movement between the element and flange. The piercing unit 144 and the flaring tool 146 form a fastening tool for affixing the strip 40 to adjacent duct flanges 196 thereby preventing movement between the flanges 196 of the duct section 44 after the element 42 is separated from the duct.

The previously described shear 140 separates the leading element 42 from the patterned strip 40 after the strip is connected to the duct. As will be appreciated by those skilled in the art, the slot punch 150 and die 152 of the shear 140 are shaped (only the angled shape of the die is visible in FIG. 13) for making an external portion 210 (FIG. 18A) on the separated element 42 and the internal portion 212 on the end of the strip 40 which will become the next separated element. Thus, the shear 140 shapes the next element 42 on the strip 40 to be received in adjacent flanges of a duct section. Operation of the slot punch 150 and die 152 on the strip 40 is schematically shown in FIGS. 22A and 22B. In FIG. 22A, the strip 40 is attached to the flanges 196 of the duct section. Break lines B1 and B2 indicate where the slot punch and die will break the stip 40 to separate the lead element. FIG. 22B illustrates removal of the duct section 44 and attached element 42 from the strip 40. It may be seen that the slot punch 150 and die 152 form the smooth external portion 210 of the leading element 42 attached to the flanges 196, and also the smooth internal portion 212 on the immediately following element.

A plate 214 is pivotally mounted on the base 74 adjacent the die 152 for guiding the advancing strip 40 of connector elements 42. The plate 214 is angled upward from the base toward the die 152, and supported in this position by springs (not shown) mounted between the plate and the base 74. Thus, patterned strip 40 moving along the plate 214 moves upward so that the leading element is located above the die 152. When the duct section 44 is moved into the apparatus 72, a rim 246 of the flange 196 (FIG. 14) passes under the awaiting leading element 42 of the strip 40. The leading element 42 and the plate 214 are moved down when the leading element is held by the positioning block 160. The rim 246 of the duct flange 196 is received in the slot 96, as is shown in FIG. 22A. The plate 214 is pivoted down against the bias of the springs and automatically pops up when the positioning block 160 is retracted for elevating the next leading element 42.

Figure 13:
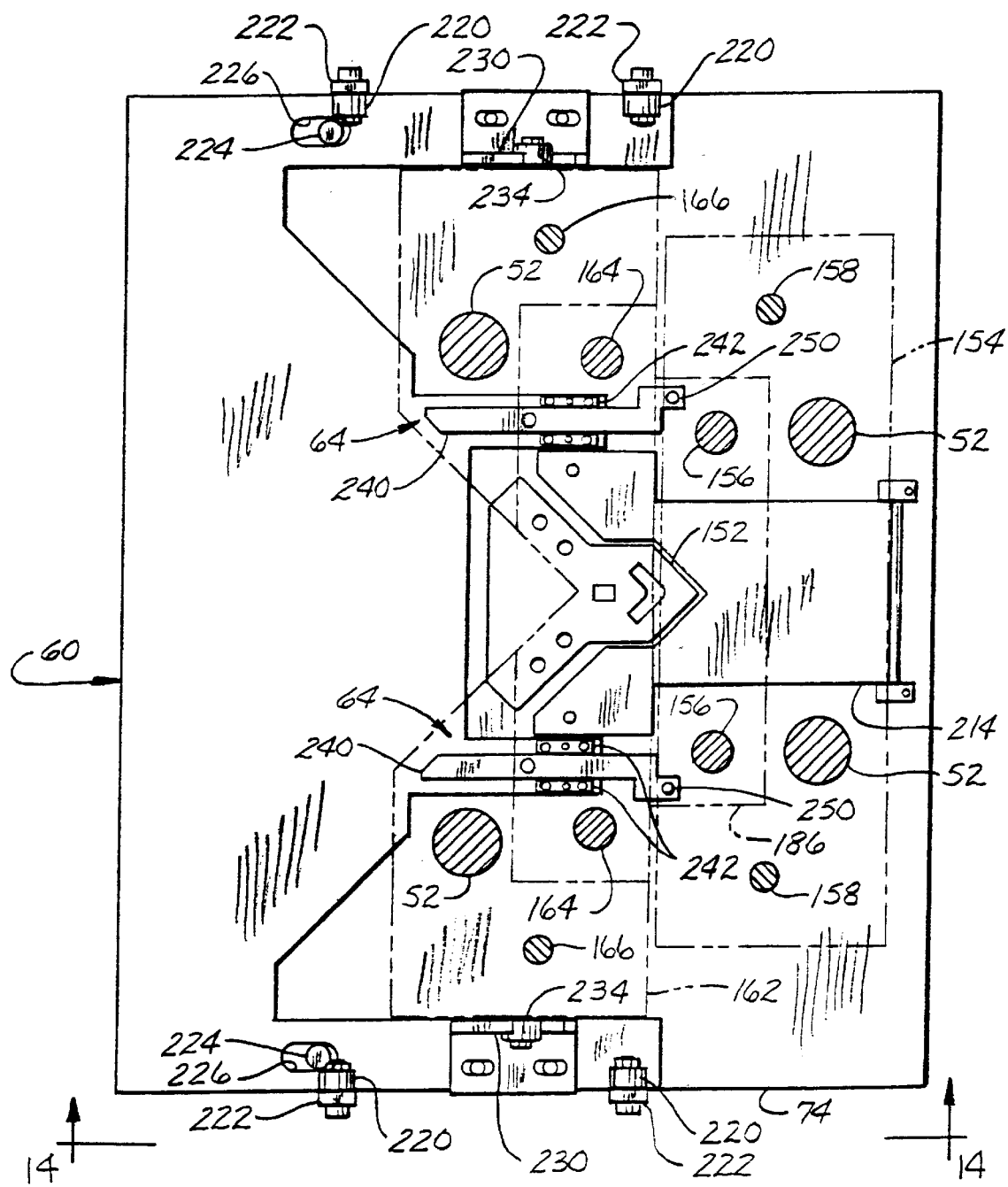
FIG. 13 is a fragmentary section of the apparatus taken in the plane of line 13—13 of FIG. 4.
Figure 14:
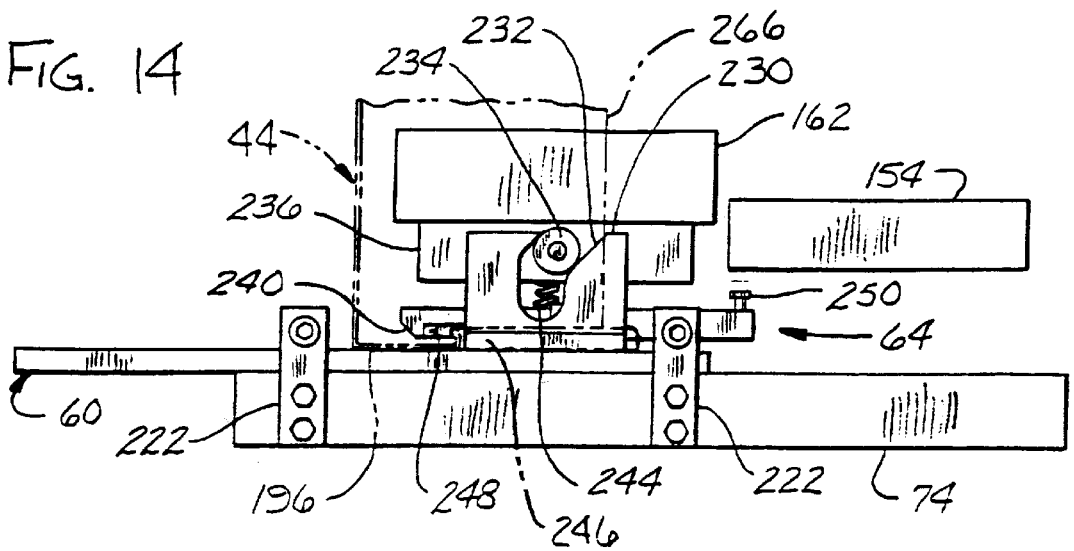
FIG. 14 is a schematic detail from the vantage indicated by line 14—14 of FIG. 13 showing a gripping mechanism prior to gripping a duct section.

As illustrated in FIG. 13, the support 60 for supporting the duct section 44 (FIG. 18) is slidably mounted on the base 74. Four roller bearings 220 mounted on adjustable mount plates 222 extending upward from the base 74 engage an upper surface of the support 60 for holding the support against the base. Two mounting bolts 224 associated with the base 74 extend upward from the frame through slots 226 on laterally opposite sides of the support 60 provided for clearance. As illustrated in FIG. 14, angle brackets 230 extend upward from each side of the support 60. The brackets 230 have cam slots 232 which receive followers 234 mounted on spacers 236 attached to each side of the positioning block carriage plate 162 so the support 60 is driven forward into the fastening apparatus 72 when the positioning block 160 is lowered and rearward when the positioning block is raised.

Figure 15:
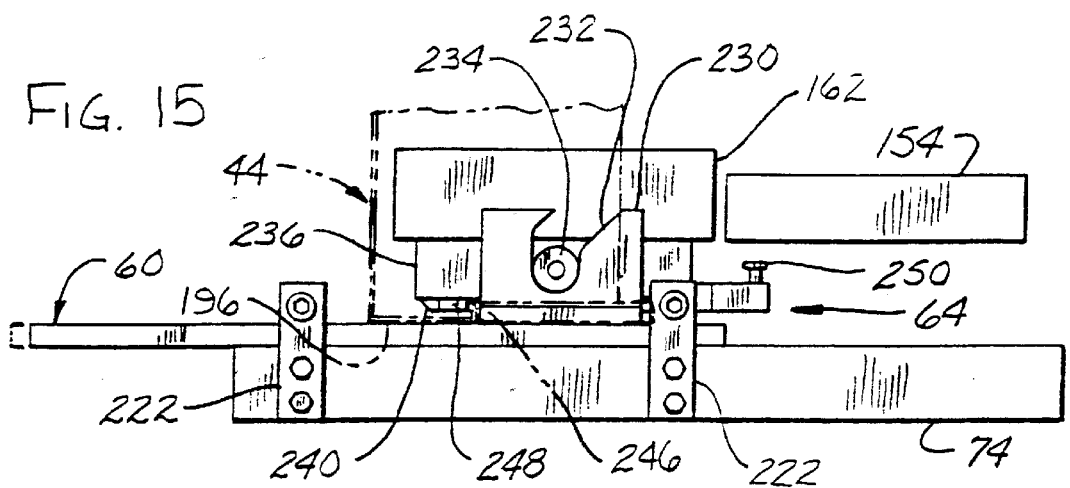
FIG. 15 is the schematic detail of FIG. 14 showing the gripping mechanism during gripping the duct section.
Figure 16:
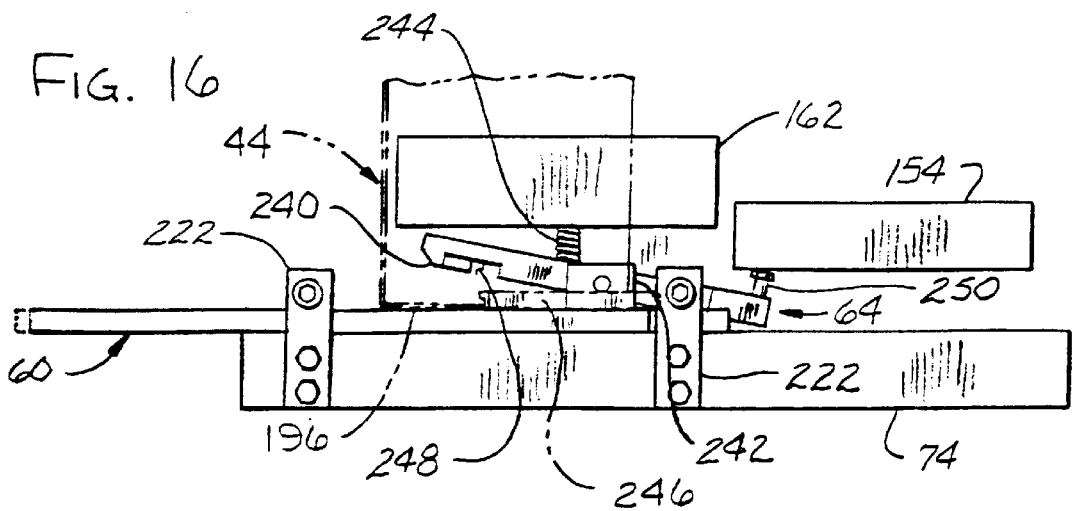
FIG. 16 is the schematic detail of FIG. 14 showing the gripping mechanism after gripping the duct section.
Figure 18A:
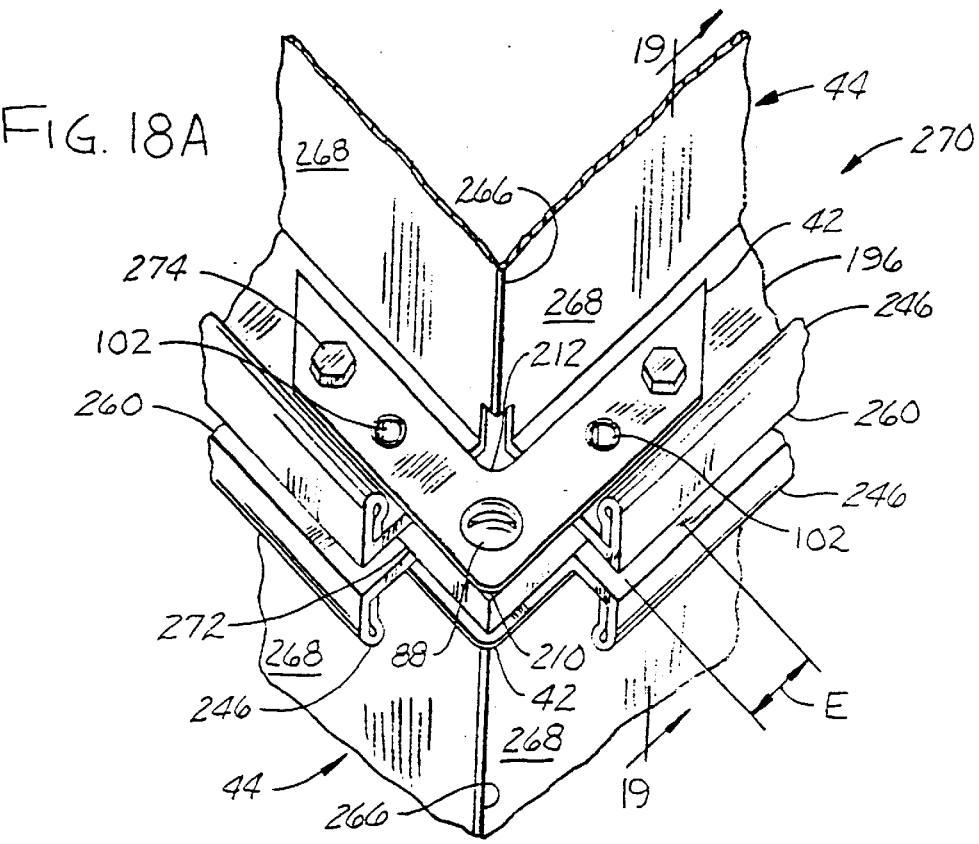
FIG. 18A is a further fragmentary perspective of a duct assembly of the present invention.

The gripping mechanisms 64 are mounted on the support 60 generally below the fixture 142. Each mechanism 64 generally includes a finger 240 pivotally mounted on the upper surface of the support 60 by mounting blocks 242. Each finger 240 is biased downward as shown in FIG. 14 by a spring 244 mounted between the positioning block carriage plate 162 and the respective finger. When a duct section 44 is loaded onto the support 60, the operator pushes the section rearward until a rim 246 formed on the flange 196 of the duct section slides under the fingers 240 and is received by slots 248 on the lower side of the fingers. Although the duct section 44 is not clamped in place by the fingers 240 because the fingers can be lifted against the biasing force of the springs 244, the fingers act to hold the duct section in place on the support 60. When the fixture 142 is actuated so the carriage plate 162 (including positioning block 160) is lowered, the followers 234 and cam slots 232 pull the support 60 forward to a position shown in FIG. 15. Thus, the duct section 44 moves into a stationary element 42 (with a corner 266 of the duct section positioned opposite the internal portion 212 of the element) which was previously put into position by operation of the indexing device 120. The movement of the support 60 and duct section 44 thereon is just ahead of the positioning block 160 pushing the leading element 42 of the strip 40 into engagement with the flanges 196 at the corner 266 (FIG. 18A). The element 42 is disposed on each flange 196 in a position spaced from and out of engagement with both an adjacent side 268 of the duct section 44 and an adjacent rim 246 of the flange. After the connector element 42 is attached to the flange 196 of the duct section 44, the fingers 240 are raised as shown in FIG. 16 by the shear carriage plate 154 as it engages set screws 250 fastened to upper sides of the fingers 240 opposite the slots 248. The bracket 230, spacer 236 and follower 234 have been omitted in FIG. 16 to better shown the finger 240. The set screws 250 permit adjustment of the height to which each finger 240 is raised.

Although the controls 48a, 48b may operate in other sequences without departing from the scope of the present invention, in the most preferred embodiment the controls operate to first extend the indexing device hydraulic actuator 124 and then hold the patterned strip 40 in place by actuating the fixture hydraulic actuators 166 before retracting the indexing device hydraulic actuator. While the strip 40 is held in place, the piercing unit 144 is actuated to drive the piercing tool 170 upward through the duct flange 196 and to push portions of the duct section 44 (i.e., fastening means) through the holes 102 in the strip. The flaring tool 146 is actuated to bend the protruding flange outward around the holes 102 of the leading connector element 42 as the piercing tool 170 is retracted. The strip 40 as attached to the duct flanges 196 is illustrated in FIG. 22A. Once the flaring tool 146 attaches the leading connector element 42 to the flange 196, the shear 140 is actuated to separate the leading connector element 42 from the strip 40 of connector elements. More specifically, the actuators 158 move the slot punch 150 down to punch an angled slot indicated by break lines B1 and B2 in FIG. 22A. After the leading element 42 is separated from the strip 40, the fixture hydraulic actuators 166 are extended to release the strip. Withdrawal of the duct section 44 with the separated element 42 attached to it is schematically illustrated in FIG. 22B. While the strip 40 is released, the patterning apparatus hydraulic actuator 114 is actuated to punch the aperture 84, slots 96 and holes 102 in the strip 40.

The apparatus 30 described above is used for making and attaching the patterned strip 40 to flanges 196 of duct sections 44 for facilitating connection of the sections in end-to-end relation. The apparatus 30 makes the patterned strip 40 with elements 42 and guides the strip toward a location where it is later connected to a flange 196 adjacent an end 260 (FIG. 18) of a section of duct 44. The duct is moved into the leading element 42 of the strip 40 while the element remains stationary. The fastening apparatus 72 affixes the strip 40 at the leading element 42 to the flanges 196 of the section of duct 44 and thereafter separates the attached element 42 from the strip 40.

As illustrated in FIG. 17, the patterning apparatus 70 of the present invention produces the patterned strip 40 of elements 42 for connecting sections of duct 44 (FIG. 18) in end-to-end relation. The strip 40 comprises an elongate sheet 262 having opposite lateral sides 264 extending between opposite ends (not shown) spaced along the longitudinal centerline 86 of the sheet. Further, the sheet 262 has evenly spaced slots 96 extending inward from each of the opposite lateral sides 264 of the sheet toward the longitudinal centerline 86. Each of the slots 96 extends at an angle A with respect to the side of the sheet from which it extends. Although other angles may be used without departing from the scope of the present invention, in the most preferred embodiment the angle A is about 45 degrees. Each of the slots 96 is laterally spaced from another slot so they extend inward from the opposite sides 264 of the sheet 262. Each slot 96 is oriented at an angle B of approximately 90 degrees with respect to the corresponding laterally spaced slot to accommodate corners 266 (FIG. 18A) of rectangular duct sections 44. Again, angles other than 90° could be used without departing from the scope of the present invention. The strip 262 also has a series of evenly spaced apertures 84 positioned along the longitudinal centerline 86 of the strip for accepting fasteners 88 (FIG. 18) to clamp the sections of duct 44 in end-to-end relation and holes 102 positioned between longitudinally adjacent slots 96 for facilitating connection of the strip to flanges of 196 a section of duct 44.

Figure 19:
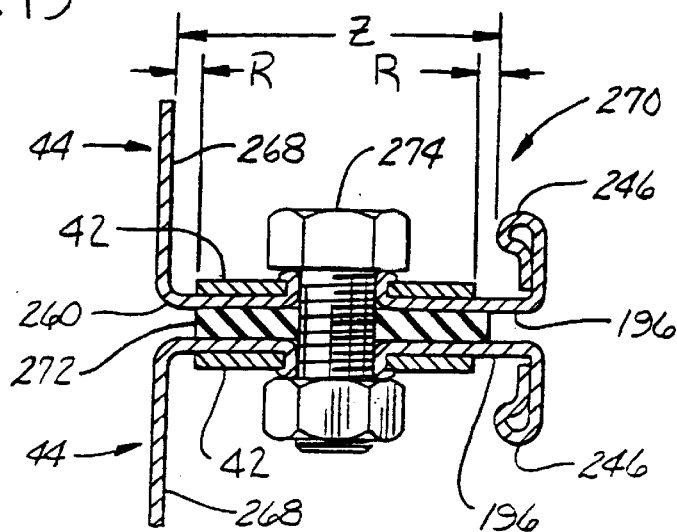
FIG. 19 is a cross section of the duct assembly shown in FIG. 18A taken in a plane including line 19—19.

FIGS. 18, 18A and 19 show a duct assembly, generally designated by 270, for transporting pressurized fluid assembled using the separated connectors elements 42 described above. The sections of duct 44 are positioned in end-to-end relation as shown so the flanges 196 extending outward from their respective ends 260 face each other thereby defining aligned flange pairs and so the corners 266 and sides 268 of the duct sections are aligned. Preferably, a conventional gasket or seal 272 is positioned between the aligned flanges 196 of the duct sections 44. The duct assembly 270 also has a flange connector pair positioned at each of the aligned corners 266 of the duct sections 44. Each connector pair comprises a pair of separated elements 42 spanning adjacent flanges 196 of each duct section 44. The pair of elements 42 are positioned on opposing faces of each flange pair 196 so the flange pair is positioned between the elements. In addition, the duct assembly 270 includes carriage bolt fasteners 88 extending through each element 42 of the element pair adjacent the corners 266 of the duct sections 44. Additional fasteners 274 may be provided through each element 42 of the pair and flange pair 196 to securely fasten the flanges together. In the illustrated embodiment (see FIG. 19), the fastener 274 takes the form of a nut and bolt fastener. Other suitable fastening devices may be used, such as sheet metal screws or machine screws (not shown). It is believed that screws of this type will provide additional strength to the joint over nut and bolt fasteners, and are also capable of being installed more rapidly. As will be understood by those skilled in the art, the fasteners 274 connecting the paired elements 42 and the flange pairs 196 not only connect the aligned connector pairs but also directly connect adjacent flanges of each duct section 44 to each other to significantly strengthen the assembly. However, it is specifically contemplated that fasteners 274 passing through the flanges 196 could be entirely omitted. In that case, the duct sections 44 would be clamped together by the carriage bolt 88. The superior strength of the connection of the separated element 42 to the duct flanges made by the piercing unit 144 and flaring tool 146 is believed to be sufficient for many applications.

The holes 102 provided in the flanges 196 and flange connectors 42 are spaced from the corner 266 by a predetermined distance E to provide leverage to prevent the flanges from separating. Although the holes may be spaced from the respective corner 266 by other distances without departing from the scope of the present invention, the holes 102 of the preferred embodiment are spaced from the respective corner 266 by a distance E of between about one half inch and about five inches. In the preferred embodiment, the holes are spaced at one and one quarter inches and two and one quarter inches from the edge of the flange at the corner 266. In addition, conventional flange clips 267 (FIG. 18) may be connected to the flange pairs 196 to prevent separation of the flange pair between the elements 42.

As illustrated in FIG. 17, the predetermined distance D and the slot width X determine the width Y of the individual elements 42. Although the elements 42 may have other widths Y without departing from the scope of the present invention, the elements of the preferred embodiment are narrower than a minimum distance Z (FIG. 19) between a side 268 of the duct section 44 and the rim 246 of the flange 196 so the elements easily fall into the channel formed by the side and rim. Thus as installed on the flanges 196, the separated element 42 engages neither the side 268 nor the rim 246 of the duct section 44 but is spaced away from each by distances R. The distance R indicated in FIG. 19 may or may not be the same between the element 42 and the side 268 as between the element and the rim 246.

Figure 20:
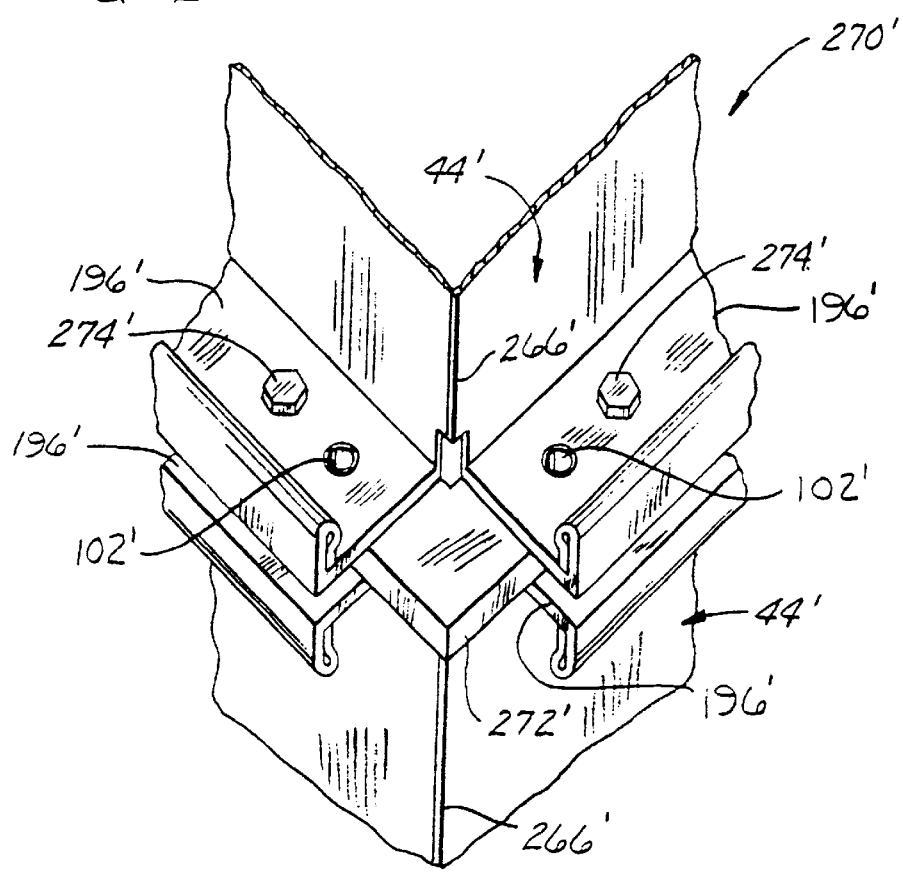
FIG. 20 is a fragmentary perspective like FIG. 18A, but of a duct assembly of a second embodiment without connector elements.

A duct assembly 270' of a second embodiment is shown in FIG. 20 to be configured substantially the same as the duct assembly 270 of FIG. 18. Parts of the duct assembly 270' corresponding to parts of the duct assembly 270 will be indicated by the same reference numeral followed by a prime. In the second embodiment, no connector elements 42 are employed. The flanges 196' of the duct sections 44' are pierced (or otherwise formed) with holes 102' which are aligned with each other in each flange pair. A suitable fastener such as a nut and bolt fastener 274' is inserted through aligned holes 102' of the duct section flanges 196' to secure them together. Preferably there are at least two fasteners 274' passing through the adjacent flanges at each corner 266', but the use of four fasteners (one for each hole 102') provides additional strength. It is to be understood that the precise number of holes and fasteners can be other than described without departing from the scope of the present invention.

Figure 23:
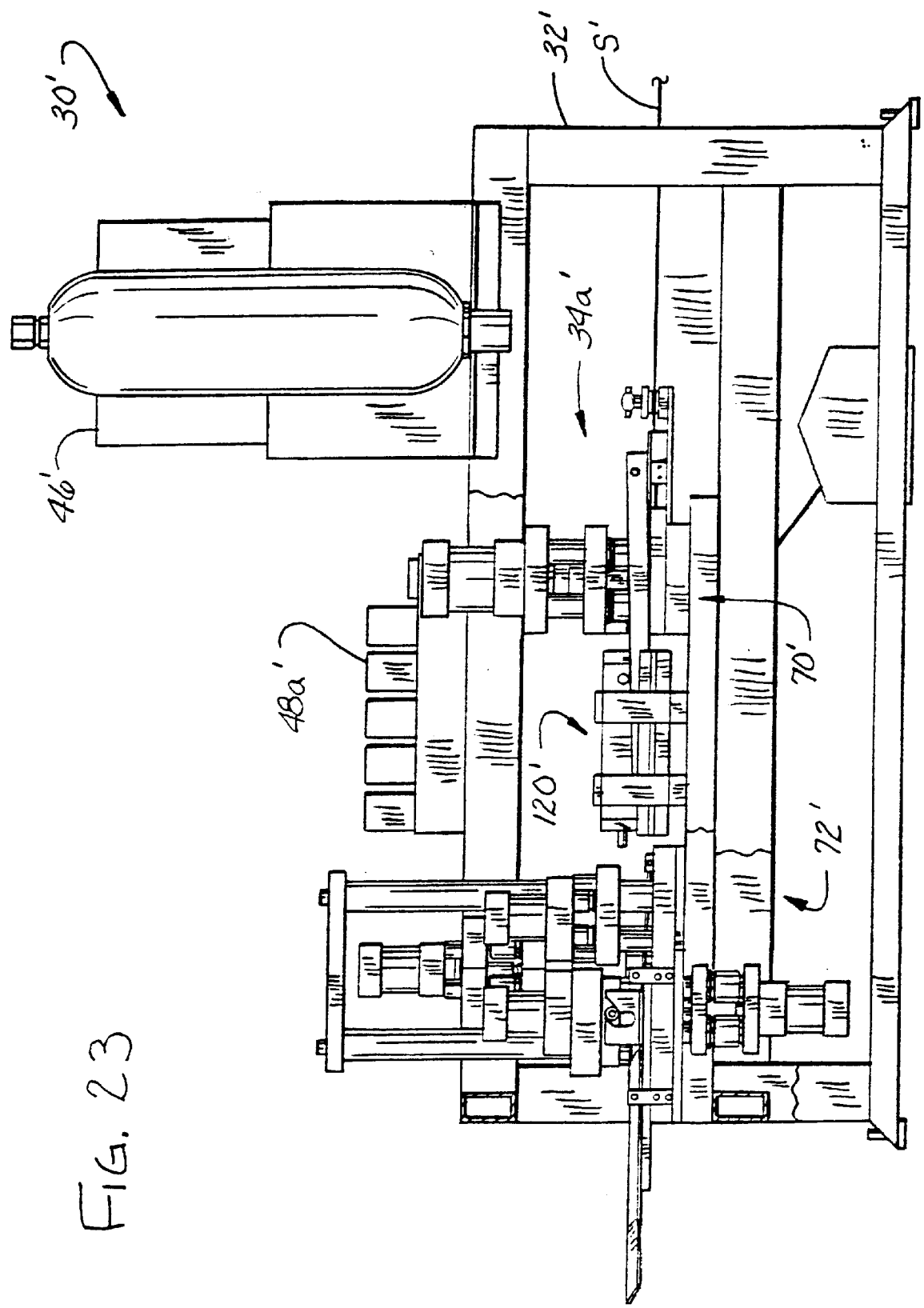
FIG. 23 is a side elevation of a second embodiment of the apparatus of the present invention for preparing duct sections for assembly.

FIG. 23 illustrates a second embodiment of the apparatus 30' of the present invention. The parts of the apparatus 30' of the second embodiment are substantially the same as the first embodiment and are designated by the same reference numerals as those of the first embodiment with the addition of a prime following the numeral. This embodiment is similar to the apparatus 30 described above except that the upper mechanism 34b and associated features have been omitted. As will be appreciated by those skilled in the art, this embodiment permits patterned strip 40 to be made and connected to one end 260 of adjacent flanges 196 of a section of duct 44. In addition to being less expensive to manufacture, this embodiment permits elements 42 of the strip to be attached to duct sections 44 of any length.

Figure 24:
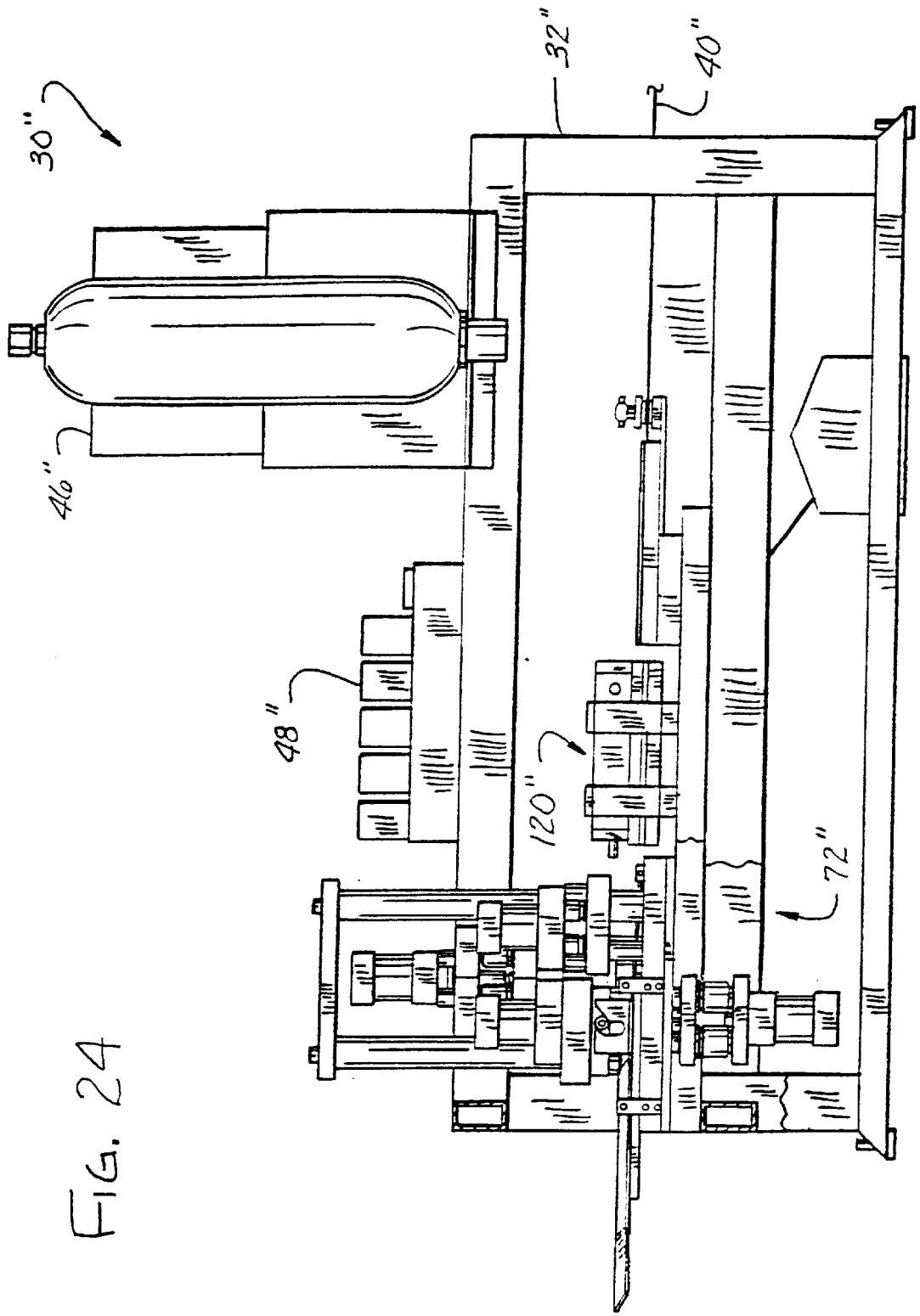
FIG. 24 is a side elevation of a third embodiment of the apparatus of the present invention for preparing duct sections for assembly.

FIG. 24 illustrates a third embodiment of the apparatus 30" of the present invention. The parts of the apparatus 30" of the third embodiment are substantially the same as the first embodiment and are designated by the same reference numerals as those of the first embodiment with the addition of a double prime following the numeral. This embodiment is closely similar to the apparatus 30' of the second embodiment except the patterning apparatus 70" has been omitted. This embodiment may be used with strips 40 of elements 42 which are pre-formed and shipped in coils to the site where the strip will be attached to the duct section flanges.

Figure 25:
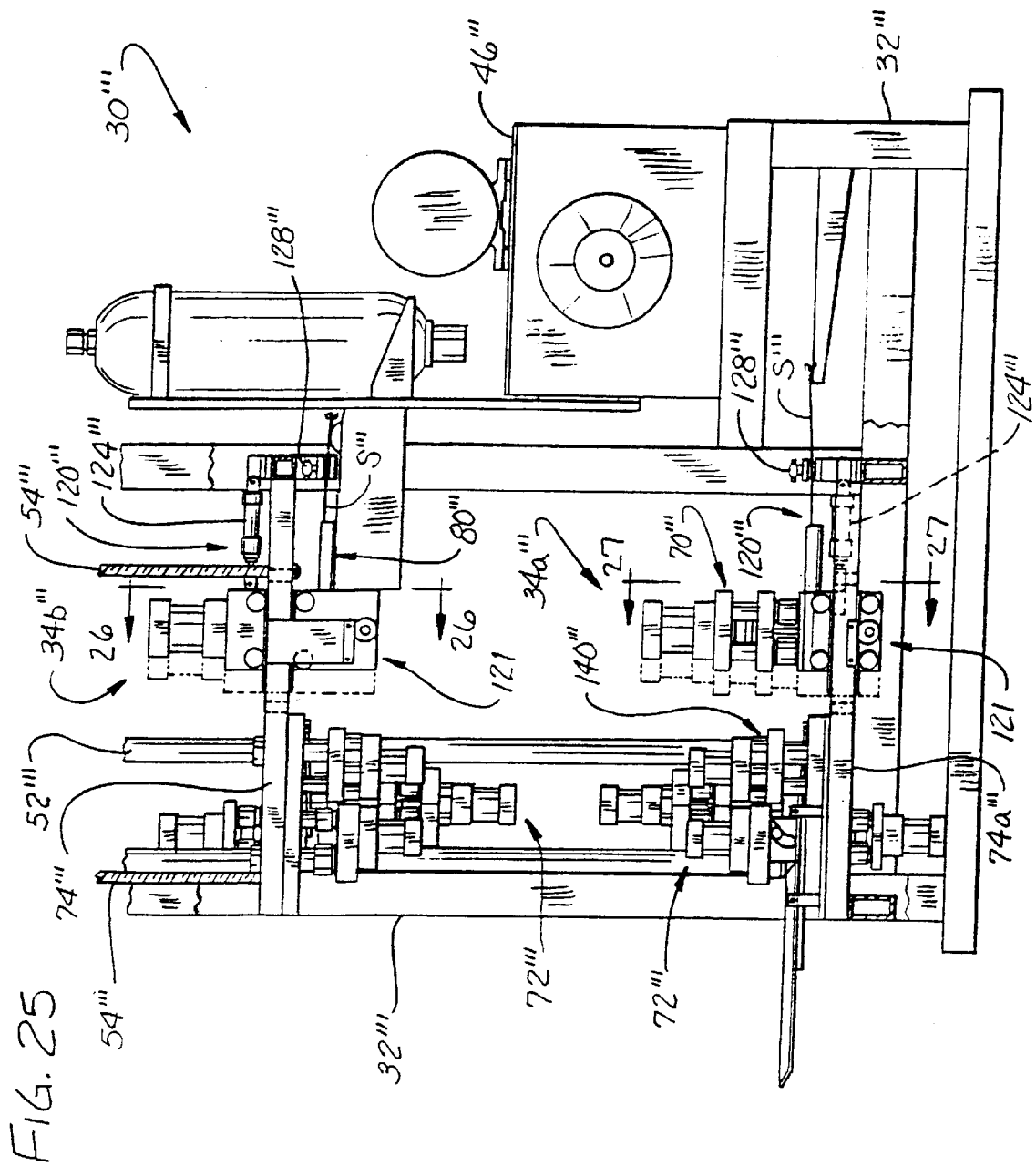
FIG. 25 is a fragmentary side elevation of a fourth embodiment of the apparatus for preparing duct sections for assembly.
Figure 26:
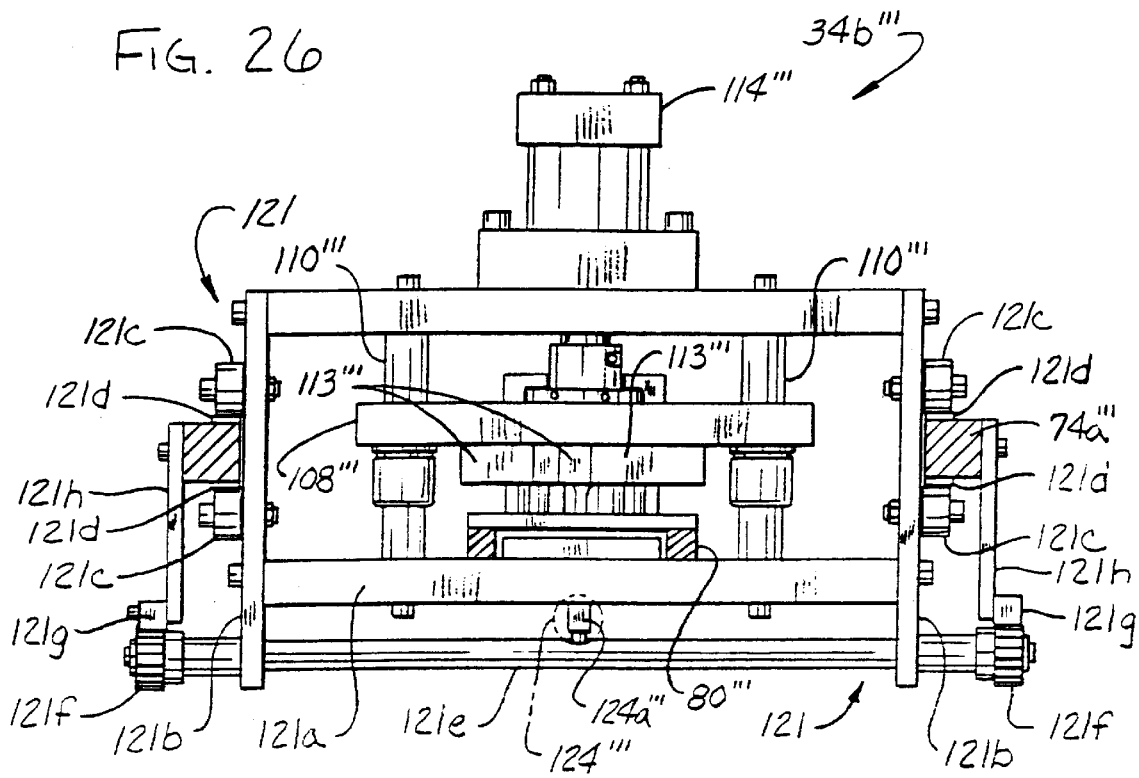
FIG. 26 is a cross section of the apparatus of FIG. 25 taken in the plane of line 26—26 and illustrating an upper strip patterning and indexing apparatus.
Figure 27:
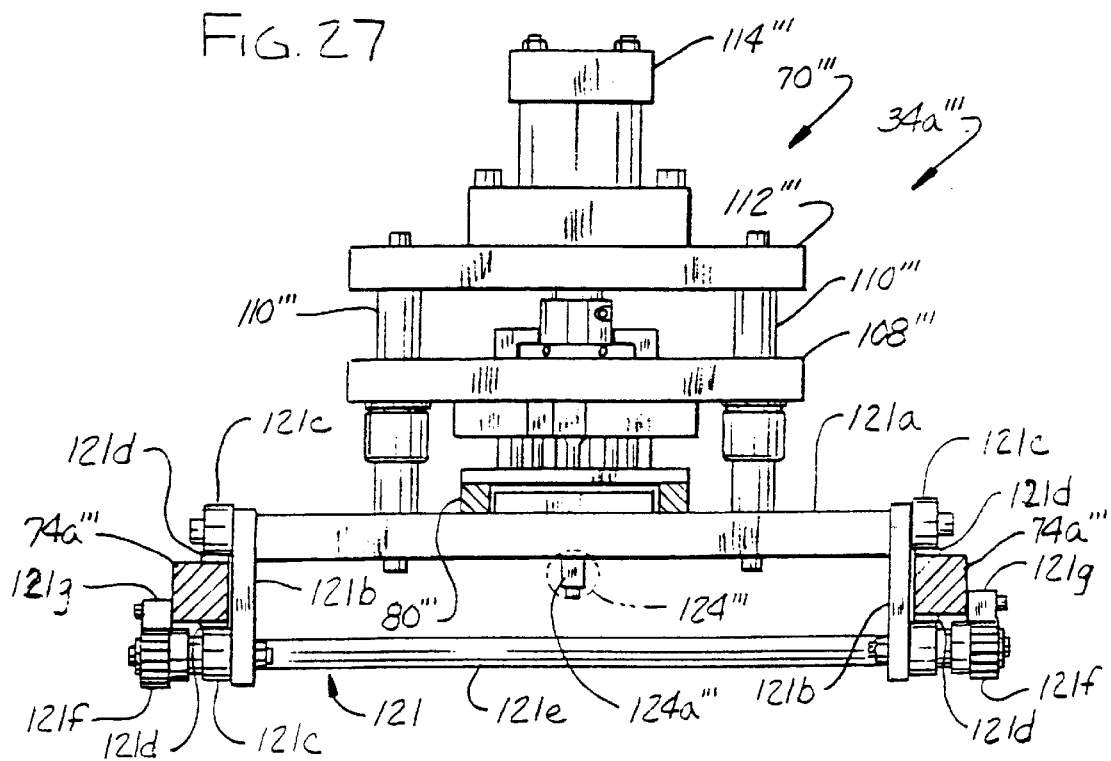
FIG. 27 is a cross section of the apparatus of FIG. 25 taken in the plane of line 27—27 and illustrating a lower strip patterning and indexing apparatus.

Referring now to FIGS. 25–27, an apparatus 30''' of a fourth embodiment is shown. Corresponding parts of the apparatus 30''' will be designated by the same reference numerals as the apparatus 30 of the first embodiment, followed by a triple prime. The apparatus 30''' is substantially the same as the apparatus 30 shown in FIG. 1 except that the strip patterning apparatus 70 and the indexing device 120 of the first embodiment have been constructed with an integration of function which allows for a more compact configuration of the apparatus 30'''. As will be explained more fully below, the strip patterning apparatus 70''' replaces the tooth 126 of the first embodiment in gripping the steel strip S''' to move it forward. The other parts of the apparatus 30''' which remain unchanged will not be further described. It is noted that the rear vertical components of the frame 32''' have been moved forward such that the hydraulic supply 46''' are located and supported by the frame to the rear of the rear vertical component in the fourth embodiment. However, these changes have no affect on the operation of the hydraulic supply 46'''. A double coil holder like the coil holder 50 is used but has not been illustrated in the fourth embodiment.

The construction of the strip patterning apparatus 70''' is substantially unchanged from the strip patterning apparatus 70 of the first embodiment. However, instead of being fixedly mounted on the base 74''', the strip patterning apparatus 70''' is mounted by the indexing device 120''' for forward and backward movement on the rails 74a''' forming the base. Referring first to FIG. 27 illustrating the lower mechanism 34a''', the indexing device 120''' of the fourth embodiment comprises a carriage, generally indicated by 121, including a platform 121a and depending side plates 121b fixedly attached to opposite lateral sides of the platform. Two pairs of generally opposed upper and lower rollers 121c are mounted for rotation on each side plate 121b. The rollers 121c in each pair are located on opposite sides of a respective one of the rails 74a''', mounting the carriage 121 for rolling movement forward (toward the fastening apparatus 72''') and backward. A cylinder 124''' of the indexing device 120''' mounted at its barrel end on the frame 32''' is attached by a block 124a''' to the platform 121a of the carriage 121 for moving the carriage forward and backward. The extreme backward and forward positions of the strip patterning apparatus 70''' are illustrated in solid and phantom lines, respectively, in FIG. 25. Hardened wear strips 121d mounted on the upper and lower surfaces of the rails 74a''' engage the rollers 121c and protect the rails from wear. The carriage 121 further includes a guide bar 121e extending between and through the side plates 121b. Pinions 121f rotatably mounted on the ends of the guide bar are enmeshed with respective racks 121g mounted on the rails 74a'''. The guide bar 121e, pinions 121f and racks 121g hold the strip patterning apparatus 70''' in alignment as it moves. The adjustable drag brake 128''' is of the same construction as brake 128 of the first embodiment, but is mounted on the frame 32 so that it does not move with the strip patterning apparatus 70'''.

The indexing device 120''' of the upper mechanism 34b''' has all of the components described above which are part of the indexing device of the lower mechanism 34a'''. However in order to fit the indexing device 120''' and strip patterning apparatus 70''' of the upper mechanism 34b''', the side plates 121b are made longer, and the mounting plate 112''' of the strip patterning apparatus is widened and attached to the side plates, as is shown in FIG. 26. In order for the pinions 121f of the guide bar 121e to engage the racks 121g in the upper mechanism 34b''', the racks are mounted to the rails 74a''' by extenders 121h hanging down from the side rails. The drag brake 128''' of the upper mechanism 34b''' is mounted on the frame in a location below the cylinder 124''', rather than above as with the lower mechanism 34a'''.

The operation of the apparatus 30''' of the fourth embodiment is substantially the same as the apparatus 30 of the first embodiment, except that initial feeding of the strip S''' is simplified and the apparatus 30''' can be more compact. For purposes of the description, reference is made to the strip patterning apparatus 70''' and indexing device 120''' of the lower mechanism 34a''', the operation of the upper mechanism 34b''' being the same. The strip S''' is hand fed through the drag brake 128''' and into the strip patterning apparatus 70'''. The strip patterning apparatus is activated to punch the strip S''', but the punches are not released and remain extending through the strip. The cylinder 124''' is extended to move the carriage 121, strip patterning apparatus 70''' and strip S''' forward (to the position shown in phantom in FIG. 25). The strip patterning apparatus 70''' is released and the cylinder 124''' retracts to move the carriage 121 backward. The drag brake 128''' holds the strip S''' (including patterned strip 40 not illustrated in FIGS. 25–27) from moving backward with the carriage 121 and strip patterning apparatus 70'''. Although the apparatus 30''' is not fully fed, it is no longer necessary to handle the strip S''' after the first stroke of the patterning apparatus 70'''. The punch, extend, release and retract cycle is repeated until the formed strip 40 is fed through the fastening apparatus 72'''.

Once the strip 40 is fed to the fastening apparatus, the cycle of operation is generally as follows. The strip patterning apparatus 70''' moves down to punch the strip S''' and define an element 42 of a pattern (not shown in FIGS. 25–27). The cylinder 124''' extends to move the carriage 121 and strip forward the predetermined distance D into the fastening apparatus 72''', positioning an element 42 in position to be fastened to the flanges of the section of duct. The fastening apparatus 72''' is cycled as described above, except that the shear 140''' is not activated to separate the element fastened to the duct section from the strip 40. The strip patterning apparatus 70''' releases the strip and the cylinder 124''' retracts to pull the carriage 121 and strip patterning apparatus backward. The strip patterning apparatus 70''' is re-activated to punch the strip again. Thereafter, the shear 140''' extends to separate the connected element from the strip and the duct section is released for removal from the fastening apparatus 72'''. The cylinder 124''' extends as described previously. In this way the strip patterning apparatus 70''' is beneficially employed to grip the strip S''' for indexing the strip forward during operation of the apparatus 30'''.

In view of the above, it will be seen that the several objects of the invention are achieved and other advantageous results attained.

The intent of this invention is to reduce cost of the duct making process and to increase the quality of the duct assembly. In order to connect ducts, the present invention does two things. First, it elects to connect flanges of the ducts, rather than any other portion. It is not specified that the flanges be integral or added. In the preferred embodiment only, the flanges are integral with the duct walls. To accomplish the action of connecting the duct flanges, the present invention does one of three things: it can either clamp connectors of the aligned ducts, clamp flanges of these aligned ducts, or clamp both the connector portions and the flanges. The action of clamping the connectors, flanges, or both is accomplished in the preferred embodiment only with fasteners, for example, carriage bolts.

In order to connect ducts, the present invention does another thing: it elects to rigidize flanges of the ducts, rather than any other portion. Again, it is not specified that the flanges be integral or added. In the preferred embodiment only, the flanges are integral with the duct walls. The action of rigidizing may affect the stiffness of a duct in two ways: with respect to the common plane of aligned duct end portions, and within that plane. If this common plane were to distort, the aligned duct end portions may separate and no longer seal. Even if this plane were undistorted, the end opening of the duct may become skewed from its normal rectangular shape. Either or both of these modes of distortion can be prevented by rigidizing the flanges of the duct ends.

To accomplish the action of rigidizing the duct flanges, the present invention does two things: it acts to add a layer of rigid material to the flange, and it acts to eliminate shear motion between this layer and the flange. The added layer of material may also bridge the gap in the flange formed by the bending of the duct sides in an integral-flange design, or it may bridge the gap left between adjacent added flanges.

The other action, eliminate shear motion, is believed to be unique to the present invention. Conventional approaches allow shearing motion between the flange and its added layer. The reason for this motion is that the corner piece is wedged between the flange outer lip and the duct wall. While this arrangement prevents significant lateral motion of the piece with respect to the flange, longitudinal slip is always possible.

The meaning of "significant" here is instructive and important. It is well known in the art that small shearing motions between layers have a large effect on the rigidity of the resulting ensemble. For example, if I support a weight with a stack of two planks, the stiffness is twice as much as with one. But if one joins those two planks by gluing them along their adjacent faces, the stiffness is eight times that of a single plank. The amount of shearing motion that the glue prevents in the two plank stack may be very small compared with the bending that is observed.

Understanding the substantial advantage that eliminate shear motion confers on the present invention, the details of exactly how it is accomplished form several alternate embodiments of the invention. To accomplish the action of eliminating shear between the duct flanges and an added layer, the present invention does one of three things: it can either fasten layers such as with an adhesive over a large portion of the aligned surfaces, fix translation of the abutting surfaces by piercing the flange in one place on each leg, or fix rotation of the abutting surfaces as well by piercing the flange in two places on each leg.

In the preferred embodiment the rotation and translation are fixed by two piercings of the flange into each leg of the added layer. The alternative single piercing is sufficient to eliminate longitudinal and lateral shear, but may not prevent rotational shear. Thus it is effective in eliminating shear but not as effective as two piercings. In the preferred embodiment, the piercing is followed by a flaring action which forms a rivet of the flange material that captures the added layer. Other alternative embodiments obtain by replacing a piercing action with spot welding or other fastening means.

Referring again to the prior art method of pressing, wedging and crimping a corner piece into a duct flange, the present invention is distinct in that there is no wedging between its added layer and the upturned walls of the flange or the duct. Indeed, no contact at all takes place between the edges of the added layer and any part of the flange or duct.

Returning to the add layer function of the present invention (in order to rigidize flanges of the ducts), three things must be done: the strip must be positioned, the layer in the form of a strip of material must be held in place for fastening, and the duct must be positioned to receive the added layer.

In the preferred embodiment, an operator can see that the strip or strips are positioned properly before presenting the duct to the machine for attachment. This control assures that there is no mistake in the machine cycle, and thus the machine becomes more predictable.

The feed strip function of the present invention exists in order to add a layer to the flange. In contrast to the prior art, the strip need not take the form of a corner piece. It need not have the shape of an "L" at any time. It does not contact or press against the walls of the flange as a corner piece does. With respect to adding a layer, the distinguishing features of the invention have already been disclosed. A preferred embodiment to accomplish the feed strip function involves the two sub-functions: advance strip and sever strip. In this case, the strip material is moved forward into position, the duct is then pulled into its corresponding position, the strip is affixed to the duct flange and a portion of the strip is severed to form the added layer.

Results of this invention provide the industry with the ability to make ducting that performs to higher standards.

Referring now to FIGS. 18–21 and 28–38, a unique duct connection system referred to as "companion duct flanges" and method of the present invention is shown. FIGS. 28–38 illustrate a duct assembly 270 similar to that of FIGS. 18–21, but which can also be used with conventional corner pieces modified according to the present invention. The use of conventional corner pieces will be described more fully below. As used herein the term "corner flange connection members" refers both to modified conventional corner pieces (e.g., modified corner piece 300 shown in FIG. 32) and elements 42 of the companion duct system. Conventional corner pieces are initially secured to the integral flanges 196 of the duct sections 44 by snapping into the flange and/or by crimping over the rim 246 of the flange. However, it is unnecessary that there be any pre-connection of the corner flange connection member to the integral flanges 196 prior to making the duct assembly. A corner flange connection member of the present invention could be held in place on the flange 196 solely by the same fastener (e.g., sheet metal screw 302) which secures the duct sections 44 together.

Figure 28:
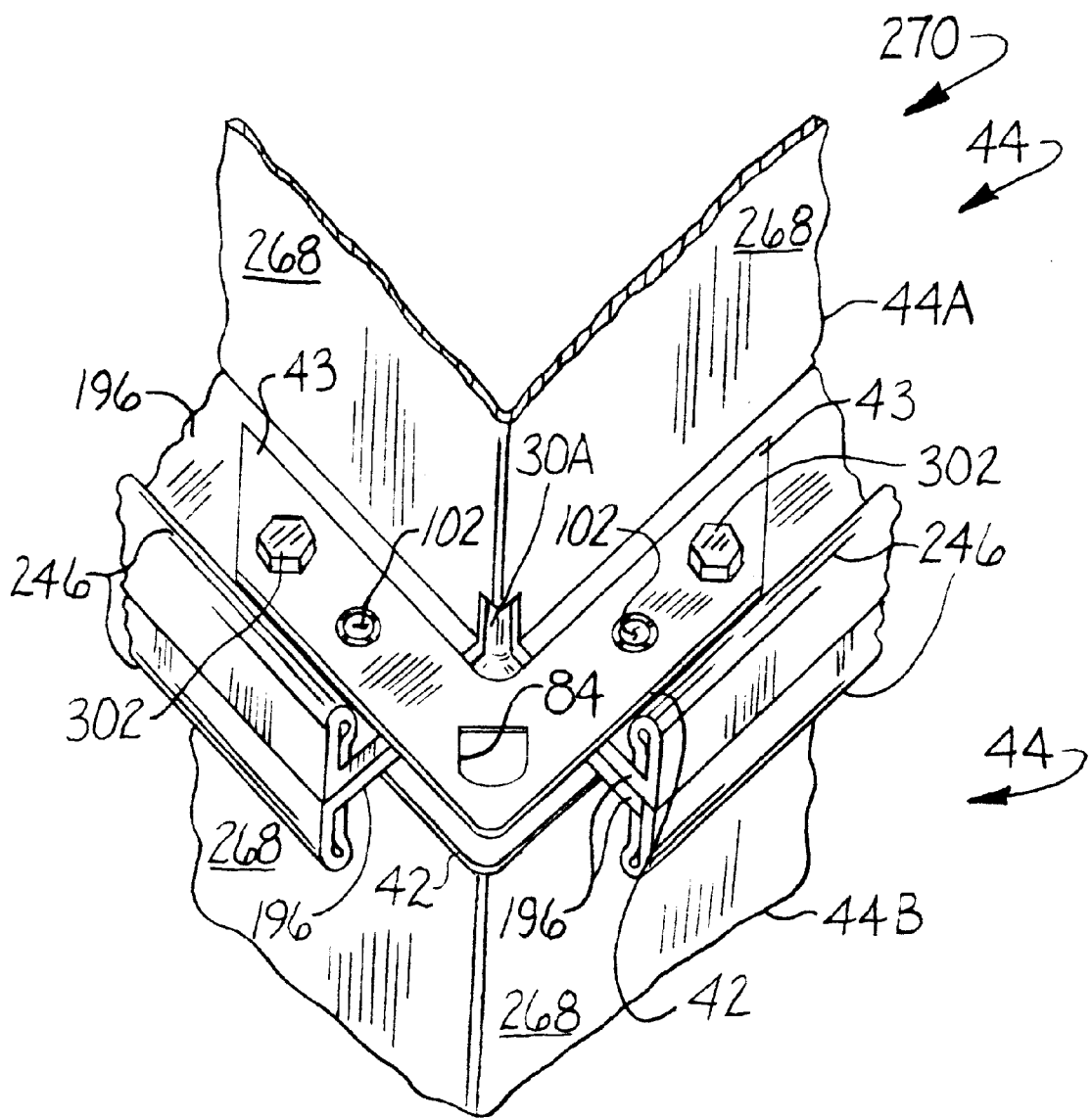
FIG. 28 is a fragmentary perspective of a duct assembly closely similar to FIG. 18A, but employing sheet metal screw fasteners.

The fragment of two joined duct sections 44 illustrated in FIG. 28 is similar to FIG. 18A, except that the carriage bolt fastener 88 of FIG. 18A is omitted and the screws 302 are used rather than the nut and bolt fastener 274. Although the duct assembly 270 is shown and described as comprising two duct sections 44 it will be understood that more than two duct sections may be joined together to form the duct assembly of the present invention. In FIG. 28, elements 42 are attached by deforming material of the duct flanges 196 through pre-formed holes 102 in the elements, as described above. One element 42 is connected at each intersection of adjacent side walls 268 of each duct section 44 for a total of four elements in each of the standard, rectangular duct sections shown in FIG. 28. For purposes of the present discussion, the respective duct sections will be designated and referred to individually, where needed, as 44A and 44B. The duct sections 44 have tape 304 applied at the intersections of the side walls 268 at the ends of the duct sections to promote sealing of the duct assembly 270 when completed. More specifically, the interior tape 304 covers a notch at the intersection of the duct section side walls 268. The interior sealing tape 304 is folded over onto the adjacent integral flanges 196 and exposed portions of the elements 42. The two duct sections 44 having attached elements 42 are aligned in an end to end relation and brought together so that the integral flanges 196 and elements, including particularly the holes 102, are generally in registration. The machine screws 302 are rotatably driven, manually or by use of a conventional powered driver (not shown), through the aligned holes 102 of the duct sections 44 so that each screw extends through the element 42 of a first of the duct sections 44A, the integral flange 196 of the first duct section, the integral flange of a second of the duct sections 44B, and the element connected to the integral flange of the second duct section.

In the illustrated embodiment, the holes 102 are approximately 5/16 inch in diameter and the machine screws 302 are 3/8 inch in diameter. However, the dimensions can be other than described without departing from the scope of the invention. The screws 302 bite into the material of the integral flanges 196 when driven through the holes 102, forming a threaded interconnection with the integral flanges and elements 42. Thus, as the screws 302 are driven, the duct sections 44 are drawn together by the action of the screws into a tight, substantially sealing relation at the joint between the duct sections. The seal is sufficient for use in low pressure HVAC applications without the use of a gasket or any other sealing material between the duct sections 44. For higher pressure applications, the seal may be augmented by application of a flowable liquid sealant 306 (see FIG. 29), self-adhesive sealing tape (not shown) or a gasket (such as gasket 272 shown in FIG. 18A) to the integral flanges 196 and connection elements 42 prior to tightening down the screws 302.

The screws 302 strongly join the duct sections 44 together in such a fashion as to permit the sections to bear a considerable transverse load with the duct sections supported only at their opposite ends. The elements 42 and screws 302 fixedly join the adjacent flanges 196, essentially preventing any relative movement therebetween. As a result, the joint between the duct sections 44 is less likely to leak or fail in use. The screws 302 can be applied quickly and easily by crews at the building site where the duct sections are joined together and installed. Moreover, the provision of the holes 102 assures that the screws 302 will be put in the right place. Although screws are shown, and are preferred, nut and bolt connectors (e.g., nut and bolt connector 274 shown in FIG. 19) or other suitable fasteners could be used in place of the screws 302 without departing from the scope of the present invention. In the event a nut and bolt connector were used, the bolt would not bite into the flange material, but the bolt and nut would provide the clamping force to the adjoining integral flanges 196 through the elements 42 to secure the duct sections 44 together in substantially sealing relation.

In the embodiment illustrated in FIG. 28, only two machine screws 302 are used, one for each of two opposing legs 43 of the elements 42 of the duct assembly 270. It is believed that this would be sufficient for most applications. However, it is within the present invention to drive screws (not shown) through the other aligned holes 102 so that there are four screws through each element 42 of the duct assembly 270 for additional strength. The precise number of holes and screws at the joint may be other than described herein without departing from the scope of the present invention. The apertures 84 which could be used to receive fasteners to secure the duct sections together are left entirely free of fasteners in the embodiment of FIGS. 28–38. As a result, these apertures 84 are available to receiving hangers (not shown) for hanging the joined duct sections 44.

Figure 29:
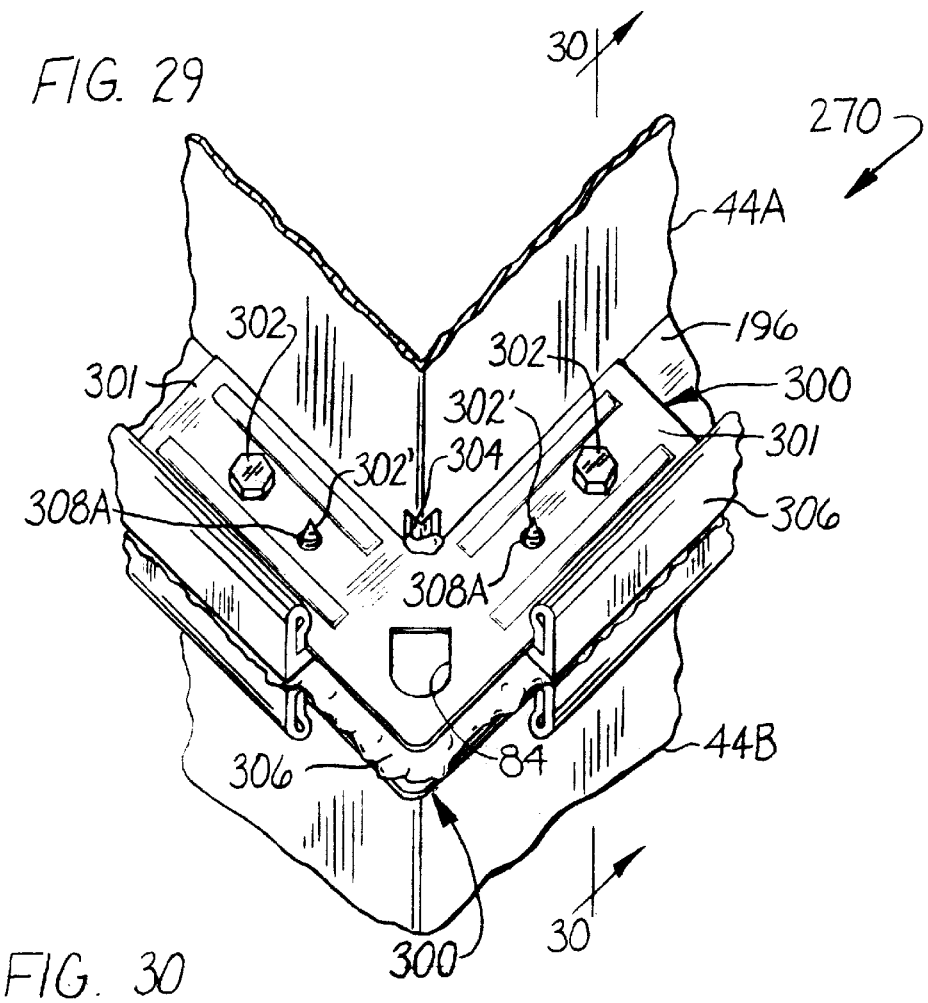
FIG. 29 is a fragmentary perspective of a duct assembly like FIG. 28, but employing modified conventional corner pieces.

Instead of securing elements 42 by forming the integral flange material through the hole in the element, a securing element, corner piece 300 (as shown in FIG. 29) or other corner flange connection member could be provided separately. The corner flange connection member does not have to be pre-connected to the duct section, by forming the integral flange 196 through the member, snapping the corner flange connection member into the integral flange, crimping the integral flange over on the corner flange connection member, or otherwise. The duct sections 44 can be brought into end-to-end relationship without having any corner flange connection members associated with either duct section. The corner flange connection member could be held manually in registration with holes in the integral flanges 196 while the screw 302 is driven through the corner flange connection member and the flange. The opposite corner flange connection member could be held in place at the same time until the screw 302 had simultaneously completed the tasks of securing each corner flange connection member to its respective adjacent integral duct section flanges 196 and securing the duct sections together. Thus it may be seen that no special corner flange connection members or other connection components, or any special equipment is necessary to make the duct assembly 270 of the present invention.

Conventional corner pieces may be modified for use in the duct assembly 270 of the present invention, as illustrated in FIGS. 29–38. A modified conventional corner piece 300 may be preliminarily attached to the integral flanges 196 at the intersection of two side walls 268 of the duct section by snapping the corner piece into the adjacent flanges, as is known. However, the corner piece 300 could be secured by crimping the rim 246 of the integral flange 196 over the corner piece or in other ways known in the art. Moreover, it is not necessary that the corner piece 300 have any pre-connection to the duct section 44 prior to the insertion of the screws 302 to connect the two duct sections 44A and 44B together.

Figure 31:
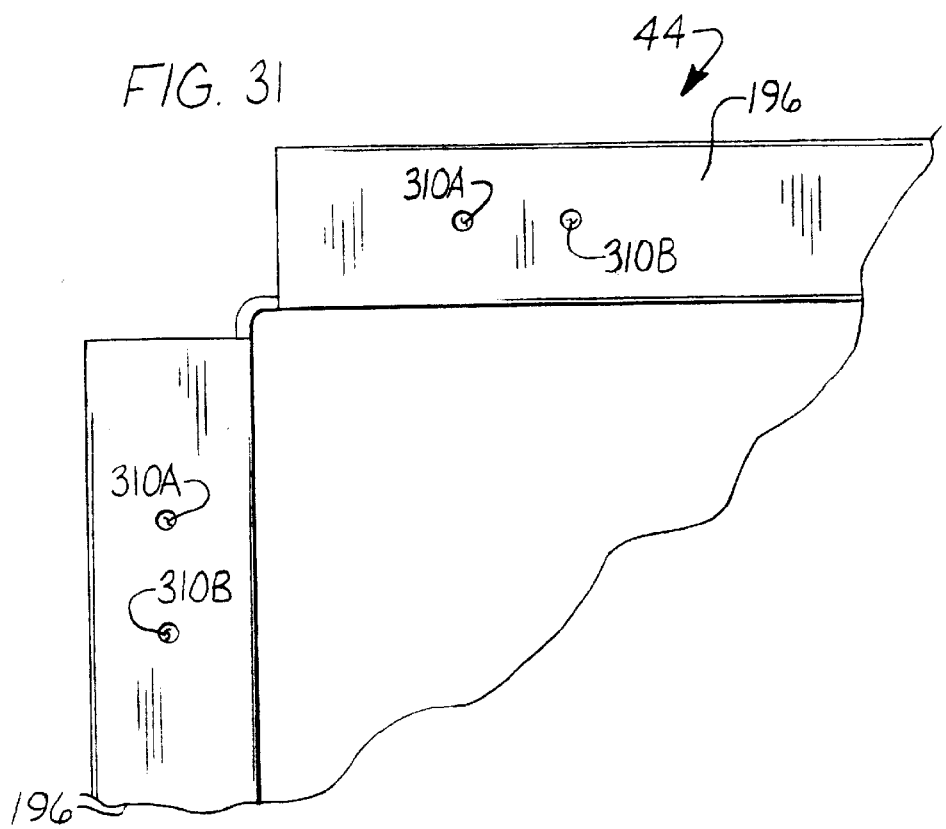
FIG. 31 is a fragmentary end view of a duct section.
Figure 32:
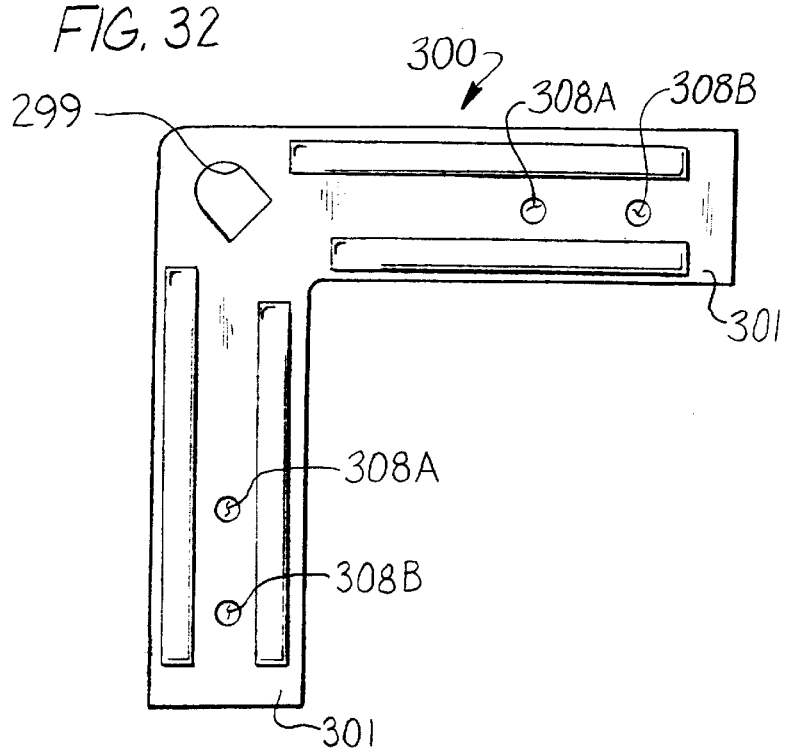
FIG. 32 is a top plan view of a modified corner piece.

Referring to FIG. 32, the conventional corner piece 300 is modified by forming two holes (designated 308A, 308B, respectively and 308, collectively) in each leg 301 of the corner piece. Two corresponding holes (designated 310A, 310B, respectively and 310 collectively) are formed in each integral flange 196 near the intersection of the side walls 268 (FIG. 31). The holes 310A, 310B in the integral flanges 196 are arranged so that the holes 308A, 308B in each leg 301 of the corner piece 300 overlie the corresponding holes in the integral flange against which that leg is received when the corner piece is secured to the flange. Formation of the holes 308A, 308B in the corner pieces 300 can be carried out at the building site (or elsewhere) where the duct sections 44 are to be assembled with a punch or other suitable device (not shown), but could also be done at the time and place where the corner pieces 300 are made. Similarly, the holes 310A, 310B in the integral flanges 196 can be made at the building site with a punch or other device, but could also be done at the time the duct sections 44 are initially formed. However, the advantage of forming the holes (308, 310) at the building site is that conventionally formed corner pieces and duct sections can be easily modified to work in the present invention without an expensive change in the stamping machines and the roll forming machines presently used to make them.

It is noted that the use of the holes 308A, 308B to secure the duct sections leaves apertures 299 in the corner pieces 300 free of fasteners in the duct assembly 270. Accordingly, these apertures are available to receive hangers (not shown) for hanging the duct assembly 270 in a building or other structure.

Figure 30:
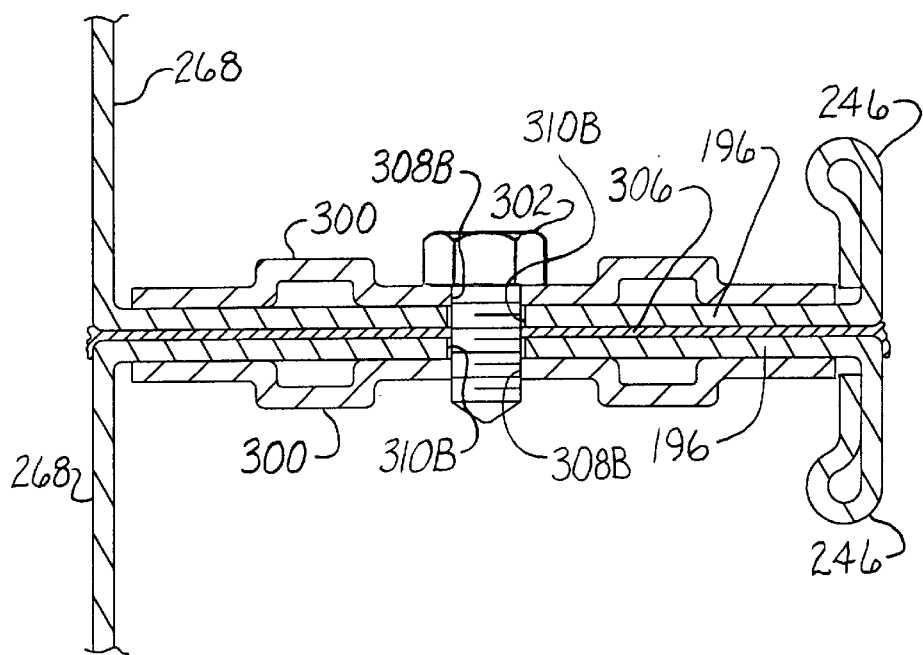
FIG. 30 is a section taken in a plane including line 30—30 of FIG. 29.

In a preferred embodiments, the holes 310A, 310B in the integral flanges 196 are made to have a diameter larger than the diameter of the fastener (e.g., screw 302) which will be passed through these clearance holes. The holes 308 formed in each leg 301 of the corner piece 300 may be of a diameter equal or smaller than the diameter of the screw 302. As indicated in FIG. 30, the screw 302 will generally not bite into the material of the flange 196 when passing through the clearance hole 310, but will bite into the material of the opposing corner pieces 300 around the smaller holes 308. In this way the screw 302 uses the corner pieces 300 to clamp together the integral flanges 196 of the respective duct sections 44A, 44B. Of course, the screw 302 may bite into the integral flange 196 because of a slight misalignment of the holes 308, 310, and the integral flange holes may be made smaller to promote direct interconnection of the screws and the integral flange while remaining in the scope of the present invention. Several variations in configuration are envisioned, including making the holes 308A, 308B in the corner piece 300 so that all are larger than the diameter of the fastener passed through them. This construction would be used, for example, when the fastener passing through the holes 308A, 308B is a nut and bolt fastener (such as fastener 274 as illustrated in FIG. 19).

Figure 33:
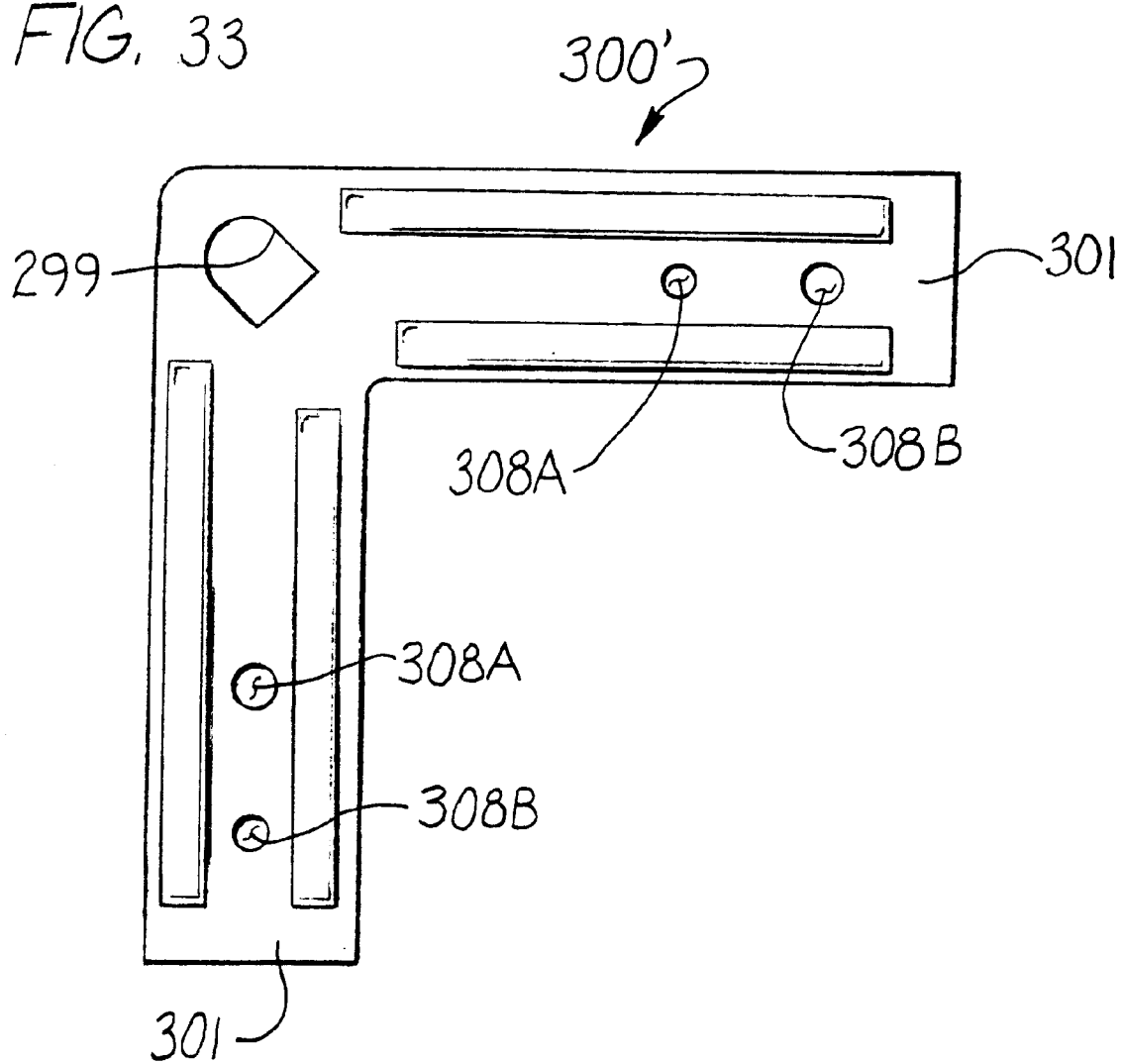
FIG. 33 is a top plan view of a modified corner piece of a second, more preferred embodiment.
Figure 34:
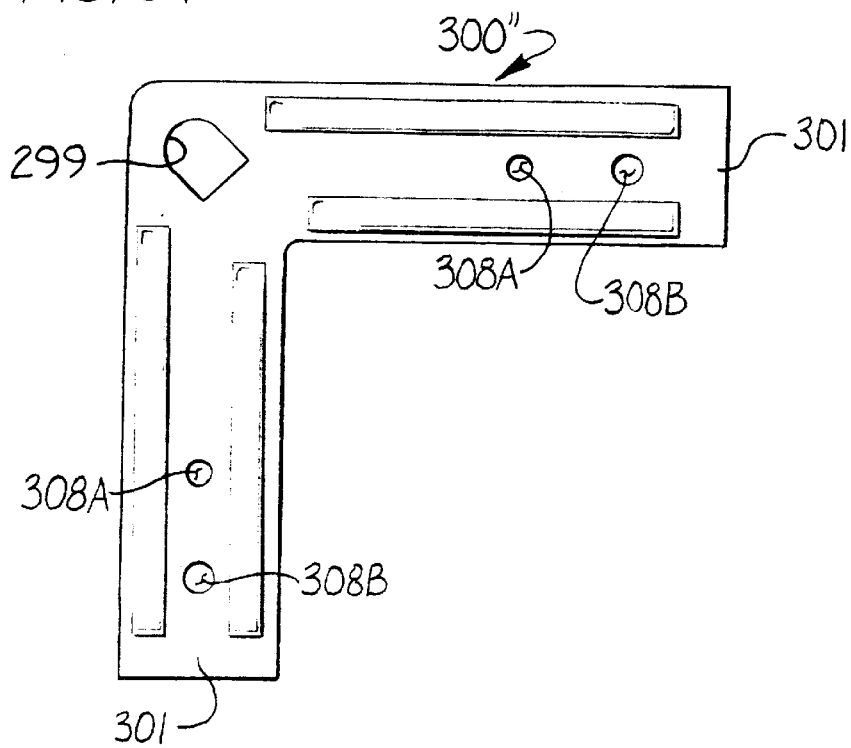
FIG. 34 is a top plan view of a modified corner piece of a third embodiment.
Figure 35:
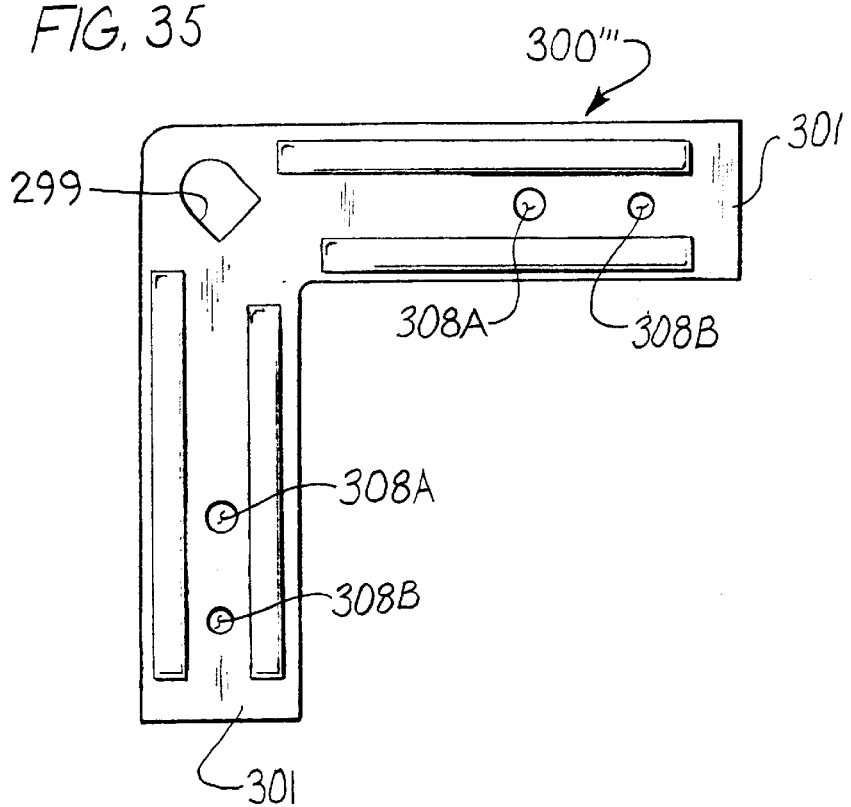
FIG. 35 is a top plan view of a modified corner piece of a fourth embodiment.

As shown in FIGS. 33–35, the holes 308A, 308B in the corner piece legs 301 could be made different sizes, one smaller and the other larger. Preferably, the smaller hole has a diameter less than the screw 302 and the larger, clearance hole has a diameter equal to or greater than that of the screw. For clarity, the corner piece of FIG. 33 will be designated 300', the corner piece of FIG. 34 will be designated 300", and the corner piece in FIG. 35 will be designated 300'". In a second embodiment shown in FIG. 33, the corner piece 300' has larger and smaller holes on each leg 301, which are reversed in order from one leg to the other. This permits the same corner piece 300' to be used when connecting the duct sections 44 together to form a duct assembly. It will be understood that when one corner piece 300' applied to one duct section 44A faces the identically formed corner piece 300' of the opposing duct section 44B, the large hole in each leg 301 of the corner piece 300' on the duct section 44A will be aligned with the smaller hole in each leg of the corner piece of the opposite duct section 44B.

Figure 36:
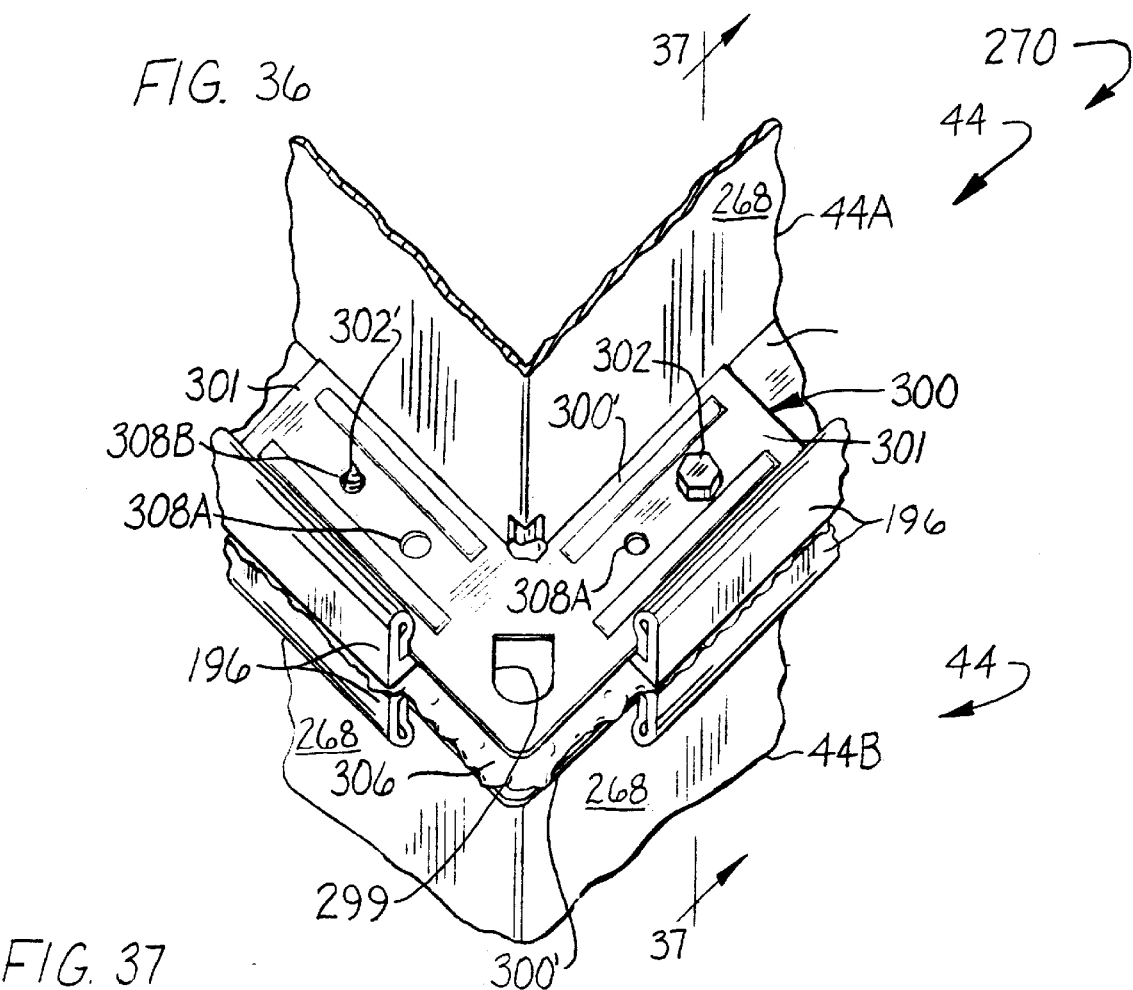
FIG. 36 is a fragmentary perspective of a duct assembly like FIG. 29, but employing the modified corner pieces of the second embodiment.
Figure 37:
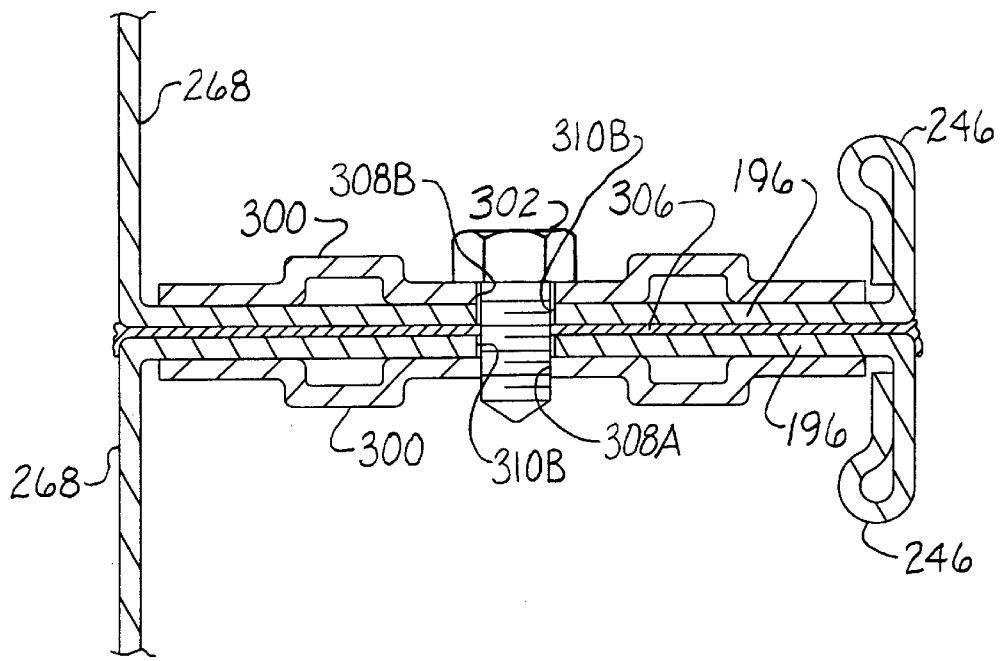
FIG. 37 is a section similar to the section of FIG. 30, but showing the modified corner piece of the second embodiment.

Referring to FIGS. 36 and 37, the screw 302 is passed first through the large hole 308B in the right leg 301 (as seen in FIG. 36) of the corner piece 300' of the duct section 44A, through the aligned clearance holes 310B in the duct sections 44, and into the smaller hole 308B on the corner piece on the opposite duct section 44B. The screw is tightened down so that its thread bites into the material of the corner piece 300' on the duct section 44B in the smaller hole 308B on the corner piece of the duct section 44B. The head of the screw 302 engages the corner piece 300' on the duct section 44A around the larger hole 308B so that the corner pieces and hence the integral flanges are clamped together by the action of tightening the screw 302. At least one other screw 302' is driven through the left legs 301 of the corner pieces 300'. Preferably, the other screw 302' is applied from the opposite side, entering first through the large hole 308B on the corner piece 300' on the duct section 44B, passing through the aligned holes 310B of the integral flanges 196, and into the small hole of the corner piece in the flange of the duct section 44A. Additional screws (not shown in FIG. 36) may also be applied as needed. As is apparent, the screws 302, 302' are extending in opposite directions. The use of the larger holes in the corner pieces 300' permits the screws 302, 302' to be more easily and quickly driven through the corner pieces and integral flanges 196 of the aligned duct sections 44.

As shown in FIGS. 34 and 35, the arrangement of the larger and smaller holes 308 in the legs 301 of the corner pieces can be altered without departing from the scope of the present invention. In the embodiments of the corner piece 300" and 300'" shown in these figures, the large and small holes are arranged symmetrically on the corner pieces. However, the symmetrical arrangement of holes 308 is lesser preferred because in order to achieve alignment of large holes with small holes in a duct assembly different types of corner pieces (i.e., one each of corner pieces 300" and 300'") would preferably be used.

Reference is made again to the embodiment of FIG. 29 for a description of the general assembly process. Eight corner pieces 300 are made to have two holes 308 in each leg 301. The corner pieces 300 are then snapped into respective adjacent integral flanges 196 on the end of each duct section 44A, 44B. The duct sections 44 are sealed at their ends where the sides 268 intersect by applying pieces of sealing tape 304 on their interiors, substantially as described above for the embodiment of FIG. 28. The flowable duct sealant 306 is applied to the outwardly facing surfaces of the integral flanges 196 and to the outwardly exposed portions of the corner pieces 300. Suitable duct sealant is commercially available and can be rapidly forced from a tube onto the integral flanges 196 and corner pieces. The duct sections 44A, 44B are brought into end-to-end relation with the outwardly facing surfaces of the integral flanges 196 and the corner pieces 300 closely spaced or in engagement. The screws 302 are threaded through the aligned holes 308, 310 and tightened down, as described above, to clamp the flanges 196 together. If, alternatively, the modified corner pieces 300', 300" and/or 300'" are used, then screws 302, 302' (see FIG. 35) would be inserted from opposite directions, also as described above for those embodiments.

The sealant 306 is squeezed between the opposing flanges 196 as the screws 302 are tightened, and flows to fill up any voids between the flanges. The sealant 306 makes a substantially continuous barrier to the flow of air between the integral flanges, and also between the opposing corner pieces. It is not necessary to use a pre-formed elastomeric gasket (e.g., such as gasket 272 shown in FIG. 18A) or self-adhesive sealing tape (not shown) to seal the joint, although it is permissible to use such a gasket or tape without departing from the scope of the present invention. Use of a gasket makes connection of the duct sections 44 more difficult and time consuming in that the gasket must be held in registration with the duct section flanges until the joint is secured. Misalignment of the gasket will likely result in leakage, whereas the flowable duct sealant 306 will naturally act to fill any voids between the integral flanges 196 as they are squeezed together (see FIG. 30). Sealing tape cannot be applied as quickly, requires a relatively large bulk of tape to seal the same surface area as the flowable sealant, and requires disposal of the backing after use.

Figure 38:
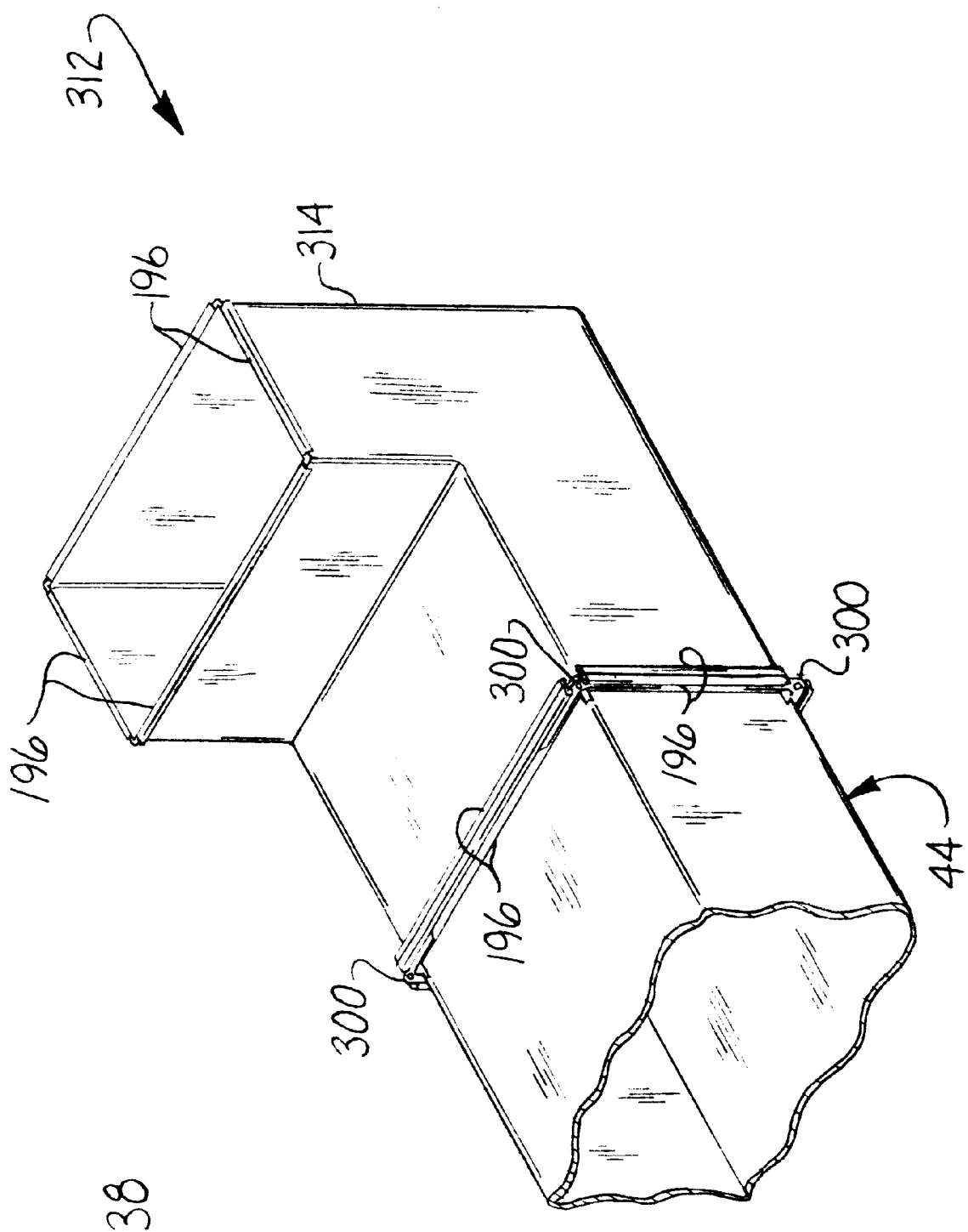
FIG. 38 is a fragmentary perspective view of a duct assembly including a fitting.

Referring to FIG. 38, the present invention has particular application to duct assemblies (designated generally at 312) including fittings. The fitting is a duct section 314 which includes a right angle turn, but could be curved or have some other non-linear extent. The duct sections 314 are not readily capable of placement in apparatus, such as described above, or conventional corner piece insertion apparatus (not shown). The steps for connection of the duct sections 44, 314 are the same as described above for connection of two duct sections 44A, 44B which are straight. The present invention permits a very robust, airtight connection of adjacent duct sections including fittings.

The present connection system provides not only substantial strength to the joint, but physically joins the adjacent side walls of each duct section 44. The strength arises from the integral connection of the element 42 (or corner piece 300) to the adjacent flanges at the intersection of the side walls 268 of the duct sections 44 by the fasteners (e.g., screws 302) extending through the corner flange connection members and integral flanges. As a result, it becomes more practical to ship the duct sections 44 in a knocked down form from a manufacturing location to a building site. More specifically, the duct sections 44 may be formed from sheet metal by a roll forming machine (or other suitable forming apparatus) in all respects except that the seam connecting the free ends of the sheet metal to close the duct section is not closed. The duct section 44 is left in a generally L-shaped configuration (or an entirely flat configuration) which permits numerous duct sections to be compactly nested for transport. This is to be contrasted with the situation where the duct section is filly formed. A substantial amount of empty space is present when the duct section is shipped because it is not possible to nest completed duct sections. The duct section 44 can be completed at the building site by forming the L-shaped configuration into a rectangle and closing the seam to connect the free longitudinal edges. While shipment of duct sections in knocked down configuration and final construction at the building site is known, it was previously difficult to be certain a good seam was formed at the building site. The conventional corner pieces provided no assistance in maintaining the integrity of the seam. If improperly formed, the duct section was certain to leak. However in the present companion duct flange connection system, the corner flange connection members make a strong tie between the adjacent integral flanges 196 and adjacent side walls 268 at the seam at the ends of the duct sections 44. Thus, the corner flange connection member itself holds the seam closed where the seam terminates at the end of the duct section 44.

As a result of the present invention, the industry is provided with a duct assembly and method which permit quick and easy connection of duct sections with the further result of a stronger joint than previously achieved. The joint actually provides rigidity to the entire assembly. A greater number of duct sections may be joined together according to the present invention prior to being lifted into place without damaging the duct assembly because of sagging and deforming under its own weight while being lifted. Moreover, the industry has a more efficient way of shipping duct sections in compact, knocked down configurations to a building site and completing the sections at the site.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. As used herein, the word "form" (as variously conjugated) is intended to include punching, cutting, drilling, molding, casting or otherwise creating the thing formed.

As various changes could be made in the above constructions without departing from the scope of the invention, it is intended that all matter contained in the above description or shown in the accompanying drawings shall be interpreted as illustrative and not in a limiting sense.

What is claimed is:

1. A duct assembly for transporting pressurized fluid therethrough comprising duct sections, each duct section having sides extending between opposite ends, each of sides sides joining an adjacent side and having an integral flange extending laterally outward from each end, the integral flanges and sides being formed as one piece from sheer metal material, the duct sections being disposed in end-to-end relation with the integral flanges of one duct section generally in registration with the integral flanges of the other duct section to define a joint, at least one hole being preformed into each of the integral flanges of the restive duct sections, the preformed holes associated with the integral flanges of one duct section lying generally in registration with the preformed holes associated with the integral flanges of another duct section when the duct sections are disposed in end-to-end relation to each other, corner flange connection members located at and spanning between adjacent integral flanges of the duct sections, each corn flange connection member having two legs, each leg overlying one of the two adjacent integral flanges of the corresponding duct section, each corner flange connection member being preformed with at least one hole through each leg, the preformed holes associated with each corner flange connection member lying generally in registration with the preformed holes associated with the adjacent integral flanges of the duct sections when the legs of the corner flange connection members overlie adjacent integral flanges, and fasteners passing through the preformed holes in the corner flange connection members as well as through the preformed holes in the aligned integral flanges for attaching the duct sections in generally sealing relation at the joint, the diameter of the preformed holes in the integral flanges being larger than the diameter of the fasteners passing through and the diameter of the preformed holes associated with each leg of the corner flange connection members being equal to or smaller than the diameter of the fasteners passing therethrough.

2. A duct assembly as set forth in claim 1 wherein the fasteners are screw fasteners.

3. A duct assembly as set forth in claim 2 wherein the screw fasteners are sheet metal screws.

4. A duct assembly as set forth in claim 1 wherein the fasteners each comprises a nut and a bolt threadably received in the nut.

5. A duct assembly as set forth in claim 1 further comprising flowable duct sealant compressed between the integral flanges for use in forming a substantially air-tight seal between the duct sections.

6. A corner flange connection member adapted for attachment to a duct section having sides extending between opposite ends, each of said sides joining an adjacent side and having an integral flange extending laterally outward from each end, the integral flange on each side being adjacent to the integral flange of the adjacent side at each end of the duct section, the corner flange connection member comprising a first leg and a second leg extending generally at angles relative to each other so that when the corner flange connection member is installed where adjacent integral flanges meet at the ends of the duct section, a first leg overlies a first of the adjacent integral flanges and a second leg overlies a second of the adjacent integral flanges, the first leg having first and second holes therein located on the first leg for overlying the first integral flange and the second leg having first and second holes therein located on the second leg for overlying the second integral flange, the first and second holes being adapted to receive fasteners therethrough for joining the integral flanges of one duct section to the integral flanges of another duct section, the first hole on each leg being located between the corresponding second hole and the terminal edge portion of that respective leg, the first hole on each leg having a diameter greater than the diameter of the second hole.

7. A corner flange connection member as set forth in claim 6 further comprising an aperture located generally at an intersection of the first and second legs.

8. A method of assembling two duct sections, each duct section having sides extending between opposite ends, each of said sides joining an adjacent side and having an integral flange extending laterally outward from each end, the integral flanges and sides being formed as one piece from sheet metal material, each integral flange being adjacent to another of the integral flanges at ends of the duct section, the method comprising the steps of arranging the duct sections in generally end-to-end relation with each other such that the integral flanges of one duct section are generally aligned with integral flanges of the other duct section, providing corner flange connection members each having two legs, each leg being dimensioned to overlay one of the adjacent integral flanges associated with each duct section, each leg of each corner flange connection member having first and second holes therein located for overlaying the adjacent integral flanges of the duct sections, each corner flange connection member being installed where two adjacent integral flanges meet at the ends of each duct section, the first and second holes on each leg, of each corner flange connection member being adapted to receive fasteners therethrough for joining the integral flanges of one duct section to the integral flanges of another duct section, the first hole on each leg of each corner flange connection member being located between the corresponding second hole and the terminal edge portion of tat respective leg, the first hole on each leg having a diameter greater than the diameter of the corresponding second hole, inserting fasteners through the first and second holes associated with each leg of each corner flange connection member as well as through the aligned integral flanges, and tightening said fasteners to secure the duct sections together.

9. A method as set forth in claim 8 further comprising the step of making at least one hole in each integral flange prior to insertion of said fasteners therethrough, the at least one hole in each integral flange of one duct section being aligned generally in registration with the at least one hole in each integral flange of the other duct section when the duct sections are arranged in generally end-to-end relation with each other.

10. A method as set forth in claim 9 wherein said step of making at least one hole in each integral flange comprises making the hole with a diameter larger than the diameter of the fasteners.

11. A method as set forth in claim 8 further comprising the step of flowing a liquid sealant onto the integral flanges prior to tightening the fasteners.

12. A corner flange connection member adapted for attachment to a duct section having sides extending between opposite ends, each of said sides joining an adjacent side and having an integral flange extending laterally outward from each end, the integral flange on each side being adjacent to the integral flange of the adjacent side at each end of the duct section, the corner flange connection member comprising a first leg and a second leg extending generally at angles relative to each other so that when the corner flange connection member is installed where adjacent integral flanges meet at the ends of the duct section, a first leg overlies a first of the adjacent integral flanges and a second leg overlies a second of the adjacent integral flanges, the first leg having first and second holes therein located on the first leg for overlying the first integral flange and the second leg having first and second holes therein located on the second leg for overlying the second integral flange, the first and second holes being adapted to receive fasteners therethrough for joining the integral flanges of one duct section to the integral flanges of another duct section, the first hole on each leg being located between the corresponding second hole and the terminal edge portion of that respective leg, the first hole on one leg having a diameter greater than the diameter of the second hole on that same leg and the first hole on the other leg having a diameter smaller than the diameter of the second hole on that same other leg.

13. A method of assembling two duct sections, each duct section having sides extending between opposite ends, each of said sides joining an adjacent side and having an integral flange extending laterally outward from each end, the integral flanges and sides being founded as one piece from sheet metal material, each integral flange being adjacent to another of the integral flanges at ends of the duct section, the method comprising the steps of arranging the duct sections in generally end-to-end relation with each other such that the integral flanges of one duct section are generally aligned with integral flanges of the other duct section, providing corner flange connection members each having two legs, each leg being dimensioned to overlay one of the adjacent integral flanges associated with each duct section, each leg of each corner flange connection member having first and second holes therein located for overlaying the adjacent integral flanges of the duct sections, each corner flange connection member being installed where two adjacent integral flanges meet at the ends of each duct section, the first and second holes on each leg of each corner flange connection member being adapted to receive fasteners therethrough for joining the integral flanges of one duct section to the integral flanges of another duct section, the first hole on each leg of each corner flange connection member being located between the corresponding second hole and the terminal edge portion of that respective leg, the first hole on one leg of each corner flange connection member having a diameter greater than the diameter of the second hole on that same leg and the first hole on the other leg of each corner flange connection member having a diameter smaller than the diameter of the second hole on tat same other leg, and inserting said fasteners through the first and second holes associated with each leg of each corner flange connection member as well as through the aligned integral flanges for receiving the duct sections together.

14. A method as set forth in claim 13 further comprising installing a pair of corner flange connection members adjacent the aligned pair of integral flanges at the ends of the duct sections such that the pair of aligned flanges are sandwiched between the pair of corner flange connection members and the larger diameter hole associated with one leg of one of the pair of corner flange connection members is aligned with the smaller diameter hole associated with one leg of the other opposed corner flange connection member.

15. A method as set forth in claim 14 wherein the fasteners are inserted through the corner flange connection members such that the fasteners are passed first through the larger diameter hole in one of the legs of one of the corner flange connection members, then through the aligned flanges of the duct sections, and then through the smaller diameter hole in one of the legs of the other opposed corner flange connection members.

16. A method as set forth in claim 15 wherein the fasteners are inserted through the corner flange connection members in opposite directions.

* * * * *

UNITED STATES PATENT AND TRADEMARK OFFICE
CERTIFICATE OF CORRECTION

PATENT NO. : 6,471,256 B1
DATED : October 29, 2002
INVENTOR(S) : Fischer, Herbert J.

It is certified that error appears in the above-identified patent and that said Letters Patent is hereby corrected as shown below:

Column 21,
Line 42, delete "sheer" and replace with -- sheet --;
Line 47, delete "restive" and replace with -- respective --;
Line 54, delete "corn" and replace with -- corner --;

Column 24,
Line 1, delete "founded" and replace with -- formed --;
Line 27, delete "tat" and replace with -- that --.

Signed and Sealed this

Eleventh Day of February, 2003

JAMES E. ROGAN
*Director of the United States Patent and Trademark Office*